US012430563B2

(12) United States Patent
Chang et al.

(10) Patent No.: US 12,430,563 B2
(45) Date of Patent: Sep. 30, 2025

(54) LEARNING-BASED CLEAN DATA SELECTION

(71) Applicant: GE Precision Healthcare LLC, Milwaukee, WI (US)

(72) Inventors: Hsi-Ming Chang, Dublin, CA (US); Li Huazhang, San Ramon, CA (US); Gopal B Avinash, Concord, CA (US); Michael Joseph Washburn, Brookfield, WI (US); Venkata Ratnam Saripalli, Danville, CA (US)

(73) Assignee: GE Precision Healthcare LLC, Waukesha, WI (US)

( * ) Notice: Subject to any disclaimer, the term of this patent is extended or adjusted under 35 U.S.C. 154(b) by 1098 days.

(21) Appl. No.: 17/388,997

(22) Filed: Jul. 29, 2021

(65) Prior Publication Data

US 2023/0034782 A1    Feb. 2, 2023

(51) Int. Cl.
*G06N 3/0895* (2023.01)
*G06N 3/04* (2023.01)
*G06N 3/08* (2023.01)

(52) U.S. Cl.
CPC ............ *G06N 3/0895* (2023.01); *G06N 3/04* (2013.01); *G06N 3/08* (2013.01)

(58) Field of Classification Search
CPC ............ G06N 3/08; G06N 3/04; G06N 3/091; G06N 3/09; G06N 3/084; G06N 3/0895; G06N 3/045; G06T 2207/10116; G06T 2207/20081; G06T 2207/20084; G06T 2207/30168; G06T 7/0002
See application file for complete search history.

(56) References Cited

U.S. PATENT DOCUMENTS

| | | | |
|---|---|---|---|
| 9,811,906 B1* | 11/2017 | Vizitiu | .................. G06T 7/0012 |
| 9,916,525 B2 | 3/2018 | Mailhe et al. | |
| 10,043,088 B2 | 8/2018 | Odry et al. | |
| 10,186,038 B1* | 1/2019 | Kluckner | .................. G06T 7/70 |

(Continued)

OTHER PUBLICATIONS

Donghai Guan et al ; "Identifying mislabeled training data with the aid of unlabeled data" ; Mar. 26, 2010 (Year: 2010).*

(Continued)

*Primary Examiner* — Paul M Knight
(74) *Attorney, Agent, or Firm* — Amin, Turocy & Watson, LLP

(57) ABSTRACT

Systems/techniques that facilitate learning-based clean data selection are provided. In various embodiments, a system can access a raw dataset. In various aspects, the system can select, via execution of a data selection machine learning model, a clean dataset from the raw dataset. In various instances, the system can train a target machine learning model to perform a target task based on the clean dataset. In various aspects, the clean dataset can include candidate-annotation groupings that are in the raw dataset and that are determined by the data selection machine learning model to be suitable for training of the target machine learning model, and the clean dataset can exclude candidate-annotation groupings that are in the raw dataset and that are determined by the data selection machine learning model to not be suitable for training of the target machine learning model.

20 Claims, 25 Drawing Sheets
(1 of 25 Drawing Sheet(s) Filed in Color)

(56) References Cited

U.S. PATENT DOCUMENTS

| | | | |
|---|---|---|---|
| 10,304,193 B1* | 5/2019 | Wang | G06V 10/764 |
| 10,430,949 B1* | 10/2019 | Wang | G06T 7/174 |
| 10,713,794 B1* | 7/2020 | He | G06N 3/084 |
| 10,755,413 B1* | 8/2020 | Putha | G06T 7/0012 |
| 10,896,352 B2 | 1/2021 | Hsieh et al. | |
| 11,625,644 B1* | 4/2023 | Haramaty | G06F 16/9535 707/723 |
| 2017/0287137 A1* | 10/2017 | Lin | G06V 10/454 |
| 2018/0089505 A1* | 3/2018 | El-Khamy | H01L 27/146 |
| 2018/0260957 A1* | 9/2018 | Yang | G06T 7/143 |
| 2018/0341875 A1* | 11/2018 | Carr | G06F 16/353 |
| 2019/0114774 A1* | 4/2019 | Zhang | G06N 3/04 |
| 2019/0318261 A1* | 10/2019 | Deng | G06N 20/00 |
| 2019/0333199 A1* | 10/2019 | Ozcan | G06N 3/047 |
| 2020/0082535 A1* | 3/2020 | Lindskog | G06V 40/161 |
| 2020/0160175 A1* | 5/2020 | Vahdat | G06N 3/045 |
| 2020/0167606 A1* | 5/2020 | Wohlhart | B25J 9/1697 |
| 2020/0193609 A1* | 6/2020 | Dharur | G06T 7/143 |
| 2020/0202534 A1* | 6/2020 | Steele | G06T 7/194 |
| 2020/0250527 A1* | 8/2020 | Zhao | G06N 3/047 |
| 2020/0257543 A1* | 8/2020 | Moon | H04L 63/1433 |
| 2020/0272864 A1* | 8/2020 | Faust | G06V 10/764 |
| 2020/0302225 A1* | 9/2020 | Dutta | G06V 10/7715 |
| 2020/0320748 A1* | 10/2020 | Levinshtein | G06T 7/12 |
| 2020/0357060 A1* | 11/2020 | Dalinina | G06F 18/213 |
| 2020/0387664 A1* | 12/2020 | Kusumura | G06F 16/243 |
| 2020/0389672 A1* | 12/2020 | Kennett | H04N 19/59 |
| 2021/0224957 A1* | 7/2021 | Iwase | G06V 40/193 |
| 2021/0383530 A1* | 12/2021 | Peleg | G01N 21/9501 |
| 2022/0414402 A1* | 12/2022 | Sawkey | G06N 3/045 |

OTHER PUBLICATIONS

Jaakko Lehtinen et al ; "Noise2Noise: Learning Image Restoration without Clean Data" ; Oct. 29, 2018 ; arXiv:1803.04189v3 [cs.CV] (Year: 2018).*
NPL Brodley Identifying Mislabeled Training Data 1999.*
NPL Freeman Markov Networks for Super Resolution 2000.*
NPL Ghiassi Robust Deep Learning Framework Against Dirty Labels 2019.*
NPL Huang O2U Net 2020.*
NPL Jain VisualCheXbert Addressing the Discrepancy Mar. 2021.*
NPL Krishnan ActiveClean An Interactive Data Cleaning Framework 2016.*
NPL Lee CleanNet 2018.*
NPL Liu DL based superresolution in coherent imaging 2019.*
NPL Maeda Unpaired Image SR using Pseudo Supervision 2020.*
NPL Malkin Label Super Resolution Networks 2019.*
NPL Noise2Noise Learning Image Restoration without Clean Data 2018.*
NPL Rapson Reducing the Pain 2018.*
NPL Zhou Places A 10 Million Image Database 2017.*
NPL Wang MultiResolution CNNs for Inverse Problems 2020.*
NPL Xu Noisy As Clean 2020.*
NPL Yu LSUN Construction of a Large Scale Image Dataset 2016.*
NPL Zhang Shuffle block SRGAN for face image SR Reconstruction 2020.*
Ghiassi, A. et al. | "Robust (Deep) Learning Framework Against Dirty Labels and Beyond," 2019 First IEEE International Conference on Trust, Privacy and Security in Intelligent Systems and Applications (TPS-ISA), 2019, pp. 236-244, doi: 10.1109/TPS-ISA48467.2019.00038.

* cited by examiner

LEARNING-BASED CLEAN DATA SELECTION

TECHNICAL FIELD

The subject disclosure relates generally to clean data selection, and more specifically to learning-based clean data selection.

BACKGROUND

A machine learning model learns to perform a task by being trained on training data. To ensure adequate performance of the machine learning model, the training data is usually refined via one or more data selection techniques. Some existing data selection techniques include manual inspection of the training data by a subject matter expert. Such manual inspection is subjective and time-consuming. Other existing data selection techniques include automated rule-based filtration of the training data. Such automated rule-based filtration requires explicit definition of quantifiable metrics and/or numerical criteria that distinguish acceptable training data from unacceptable training data. Unfortunately, such metrics and/or criteria are often unavailable, unknown, and/or not amenable to explicit quantification. Even if such explicit metrics and/or criteria are available, it can often be the case that they fail to fully capture the distinction between acceptable training data and unacceptable training data.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate learning-based clean data selection are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various cases, the receiver component can access a raw dataset. In various aspects, the computer-executable components can further comprise a selection component. In various cases, the selection component can select, via execution of a data selection machine learning model, a clean dataset from the raw dataset. In various instances, the computer-executable components can further comprise a training component. In various cases, the training component can train a target machine learning model to perform a target task based on the clean dataset.

According to one or more embodiments, the above-described system can be implemented as a computer-implemented method and/or a computer program product.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
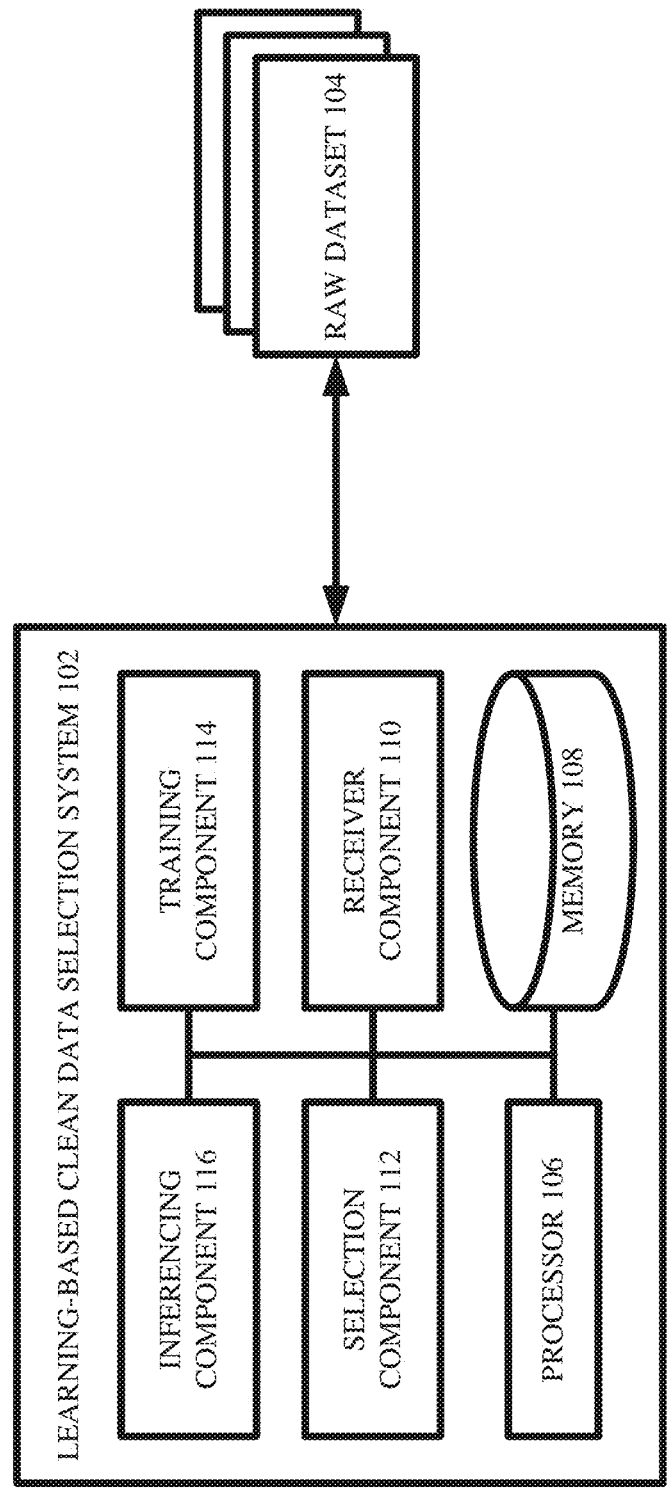
FIG. 1 illustrates a block diagram of an example, non-limiting system that facilitates learning-based clean data selection in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A machine learning model can learn to perform a task by being trained on training data. For example, a classification model can learn to classify a data candidate (e.g., an image, a sound recording, and/or any other suitable type of data) by being trained via backpropagation on a set of training data candidates, where each training data candidate corresponds to a ground-truth classification label. As another example, a segmentation model can learn to segment a data candidate (e.g., an image, a sound recording, and/or any other suitable type of data) by being trained via backpropagation on a set of training data candidates, where each training data candidate corresponds to a ground-truth segmentation mask.

In any case, to ensure adequate performance of the machine learning model, it can be desirable to refine the training data via one or more data selection techniques. For instance, before training a machine learning model on a set of training data candidates, it can be desirable to eliminate from the set of training data candidates one or more training data candidates that are considered as being unacceptable and/or unclean. For example, the eliminated training data candidates can be considered as too noisy to be used to train the machine learning model, can be riddled with too many artefacts to be used to train the machine learning model, and/or can otherwise have any other characteristics which make them unsuitable to be used to train the machine learning model. The result of such elimination can be that the remaining training data candidates in the set are considered as being acceptable and/or clean. For instance, the remaining training data candidates can have acceptable levels of noise to be used to train the machine learning model, can have acceptable amounts of artefacts to be used to train the machine learning model, and/or can otherwise lack characteristics which would make them unsuitable to be used to train the machine learning model.

Some existing data selection techniques include manual inspection of the training data by a subject matter expert. That is, a subject matter expert (e.g., technician, clinician, operator, and/or engineer) can manually inspect, view, and/or consider each training data candidate in the set of training data candidates and can manually discard any training data candidate that the subject matter expert deems to be unclean (e.g., deems to be unsuitable for training). Unfortunately, such manual inspection is highly subjective (e.g., can vary and/or be inconsistent across subject matter experts) and time-consuming.

Other existing data selection techniques include automated rule-based filtration of the training data. That is, a computer can be programmed to automatically inspect, view, and/or consider each training data candidate in the set of training data candidates and can automatically discard any training data candidate that fails to satisfy one or more explicit rules that define clean training data (e.g., that define what data is suitable for training). However, such automated rule-based filtration relies upon the explicit definition of quantifiable metrics and/or numerical criteria (e.g., the rules) that distinguish clean training data from unclean training data. Without such explicit metrics and/or criteria, the computer would have no way of distinguishing clean training data candidates from unclean training data candidates. Unfortunately, such metrics and/or criteria are often unavailable, unknown, and/or not amenable to explicit quantification. Furthermore, even if such explicit metrics and/or criteria are available, it can often be the case that they fail to fully capture the distinction between clean training data candidates and unclean training data candidates. In other words, due to the rigid nature of such explicit metrics/criteria, it can be the case that one or more training data candidates that satisfy the metrics/criteria are nevertheless actually unclean, and/or it can conversely be that the case that one or more training data candidates that fail to satisfy the metrics/criteria are nevertheless actually clean.

As a non-limiting example, consider a given machine learning model that is configured to improve X-ray image quality. That is, the given machine learning model can be configured to receive as input a low-quality X-ray image (e.g., a pixel-array and/or voxel-array generated by an X-ray scanner, that depicts any suitable object, and that exhibits high blurring, high noise, high distortion, and/or many artefacts) and to produce as output a higher-quality version of the low-quality X-ray image (e.g., a resulting pixel-array and/or voxel-array that depicts the any suitable object and that exhibits reduced blurring, reduced noise, reduced distortion, and/or fewer artefacts). To facilitate training of the given machine learning model, there can be a set of annotated training X-ray images, where each training X-ray image is a low-quality X-ray image and where each training X-ray image is annotated with a corresponding high-quality version of the training X-ray image.

In various cases, it can be desirable for the given machine learning model to learn how to generate clearer image features from blurry and/or noisy image features. For instance, if a particular pixel/voxel patch of a low-quality X-ray image depicts a noisy and/or blurry anatomical structure (e.g., tissue and/or portion thereof, bone and/or portion thereof, organ and/or portion thereof), it can be desirable for the given machine learning model to output a higher-quality X-ray image whose corresponding pixel/voxel patch depicts a clearer, less noisy, and/or less blurry version of such anatomical structure. However, it can be undesirable for the given machine learning model to learn how to generate image features from noise alone. For instance, if a particular pixel/voxel patch of a low-quality X-ray image depicts noise without a recognizable anatomical structure, it can be undesirable for the given machine learning model to output a higher-quality X-ray image whose corresponding pixel/voxel patch depicts an anatomical structure (e.g., in such case, the given machine learning model would essentially be learning to guess, without good reason, an anatomical structure with which to replace pure noise).

Thus, to ensure proper performance of the given machine learning model, it can be desirable to eliminate from the set of annotated training X-ray images any training X-ray image that has a high-quality annotation which includes anatomical structures derived from noise (e.g., anatomical structures that are not depicted in the training X-ray image). Such training X-ray images can be unsuitable for training the given machine learning model and can thus be referred to as unclean. On the other hand, it can be desirable to retain in the set of annotated training X-ray images any training X-ray image that has a high-quality annotation which does not include anatomical structures derived from noise (e.g., any anatomical structure depicted in the high-quality annotation is also depicted in the training X-ray image). Such training X-ray images can be suitable for training of the given machine learning model and can thus be referred to as clean.

According to some existing techniques, a clinician can manually inspect each of the set of annotated training X-ray images and can manually discard any training X-ray image whose annotation includes an anatomical structure derived from noise. Unfortunately, such manual inspection is highly inefficient, time-consuming, and prone to human error. According to other existing techniques, rule-based filtration can be applied to the set of annotated training X-ray images, such that any annotated training X-ray image that fails to satisfy one or more explicit rules is determined to be unclean and thus discarded. Such explicit rules can include a signal-to-noise ratio threshold, a contrast-to-noise ratio threshold, and/or a structural similarity threshold. Unfortunately, such explicit rules can fail to appropriately capture the distinction between clean and unclean training X-ray images. Specifically, such explicit rules take an aggregate view of each training X-ray image and/or each high-quality annotation; such explicit rules cannot reliably determine whether granular pixel/voxel patches depicting anatomical structures in a high-quality annotation are being derived from granular pixel/voxel patches of noise in a corresponding training X-ray image. Moreover, even at the aggregate level, such explicit rules can fail to accurately measure image quality (e.g., it can be the case that a high-quality annotation looks unnatural upon visual inspection by a human being, notwithstanding that the signal-to-noise ratio, contrast-to-noise ratio, and/or structural similarity metrics are improved as compared to a corresponding training X-ray image). Furthermore, the specific values of a signal-to-noise ratio threshold, a contrast-to-noise ratio threshold, and/or a structural similarity threshold can depend on underlying data distributions (e.g., pixel/voxel value distributions) in the set of annotated training X-ray images, and such specific values can require tuning and/or changing as such underlying data distributions change (e.g., as the set of annotated training X-ray images grows and/or shrinks).

Accordingly, systems and/or techniques that can address one or more of these technical problems can be desirable.

Various embodiments of the subject innovation can address one or more of these technical problems. One or more embodiments described herein include systems, computer-implemented methods, apparatus, and/or computer program products that can facilitate learning-based clean data selection. As mentioned above, existing clean data selection techniques involve manual inspection and/or rule-based filtration. Manual inspection is inconsistent, error-prone, and time-consuming. Rule-based filtration requires quantifying explicit metrics/criteria that distinguish clean data from unclean data. Unfortunately, such explicit metrics/criteria are often unavailable. Even when such explicit metrics/criteria are available, they are often too rigid to accurately capture the distinction between clean and unclean data.

As a solution to these technical problems, the inventors of various embodiments of the subject innovation devised learning-based clean data selection. In various aspects, learning-based clean data selection can involve training a first machine learning model to select clean data from a raw dataset, so that a second machine learning model can be subsequently trained on the clean data. In other words, learning-based clean data selection can be considered as an example of an artificial intelligence technique (e.g., the first machine learning model) supporting the development and/or creation of another artificial intelligence technique (e.g., the second machine learning model). Unlike manual inspection, learning-based clean data selection can be objective and time-efficient. Unlike rule-based filtration, learning-based clean data selection does not rely upon the quantification of explicit metrics/criteria that distinguish clean data from unclean data.

In various instances, embodiments of the subject innovation can be considered as a computerized tool that can facilitate learning-based clean data selection. In various cases, the computerized tool described herein can comprise a receiver component, a selection component, a training component, and/or an inferencing component.

In various embodiments, it can be desired to train a target machine learning model to perform a target task, based on a raw dataset. In various aspects, the target machine learning model can exhibit any suitable artificial intelligence architecture (e.g., can be a deep learning neural network, a support vector machine, a naïve Bayes model, a regression model). In various instances, the target task can be any suitable machine learning task (e.g., data classification, data segmentation, data forecasting/prediction, data manipulation/transformation).

In various cases, the raw dataset can comprise any suitable number of candidate-annotation groupings. In various instances, a candidate-annotation grouping can include a data candidate and a ground-truth annotation that corresponds to the data candidate. In various cases, a data candidate can be any suitable type of data, such as one or more images (e.g., one or more pixel-arrays and/or voxel-arrays), one or more videos (e.g., one or more sequences of images), one or more sound recordings (e.g., one or more timeseries sound data), and/or any other suitable type, collection, and/or format of electronic data. In various cases, a ground-truth annotation that corresponds to a given data candidate can be any suitable data that represents a correct and/or accurate result obtained when the target task is performed on the given data candidate. Accordingly, a ground-truth annotation can vary with the target task (e.g., if the target task is classification, the ground-truth annotation of the given data candidate can be a correct classification label of the given data candidate; if the target task is segmentation, the ground-truth annotation of the given data candidate can be a correct segmentation mask of the given data candidate).

As mentioned above, it can be desired to train, via the raw dataset, the target machine learning model to perform the target task. However, if the target machine learning model is trained on the raw dataset as is, the target machine learning model can be negatively affected by unclean data in the raw dataset. Accordingly, it can be desirable to filter out unclean data from the raw dataset prior to training the target machine learning model. As described herein, the computerized tool can facilitate such filtration via learning-based clean data selection.

In various embodiments, the receiver component of the computerized tool can electronically receive and/or otherwise electronically access the raw dataset. In various aspects, the receiver component can retrieve the raw dataset from any suitable data structure (e.g., graph data structure, relational data structure, hybrid data structure) that is electronically accessible to the receiver component, whether the data structure is centralized and/or decentralized, and/or whether the data structure is remote from and/or local to the receiver component. In any case, the receiver component can obtain and/or access the raw dataset, such that other components of the computerized tool can electronically interact with (e.g., read, write, manipulate) the raw dataset.

In various embodiments, the selection component of the computerized tool can electronically select, via execution and/or inferencing of a data selection machine learning model, a clean dataset from the raw dataset. In various aspects, the data selection machine learning model can be configured to receive as input any given candidate-annotation grouping in the raw dataset and to produce as output a label that classifies the given candidate-annotation grouping as either clean or unclean. Accordingly, any candidate-annotation grouping that is labeled as unclean by the data selection machine learning model can be eliminated and/or discarded from the raw dataset, and any candidate-annotation grouping that is labeled as clean by the data selection machine learning model can be retained in the raw dataset. The result of such elimination and/or discarding can be the clean dataset. That is, the candidate-annotation groupings that are not eliminated and/or discarded from the raw dataset can be those that are labeled as clean by the data selection machine learning model, and such clean candidate-annotation groupings can collectively be considered as the clean dataset. In various cases, the data selection machine learning model can exhibit any suitable artificial intelligence architecture (e.g., can be a deep learning neural network, a support vector machine, a naïve Bayes model, a regression model), such that the data selection machine learning model can be configured to distinguish (e.g., classify) clean candidate-annotation groupings from unclean candidate-annotation groupings.

In various aspects, a "clean" candidate-annotation grouping can be any candidate-annotation grouping that is suitable for training of the target machine learning model, while an "unclean" candidate-annotation grouping can be any candidate-annotation grouping that is not suitable, for any number of reasons, for training of the target machine learning model. As those having ordinary skill in the art will appreciate, what specifically constitutes a "clean" candidate-annotation grouping (e.g., suitable for training) and/or an "unclean" candidate annotation grouping (e.g., unsuitable for training) can depend upon the target task to be performed by the target machine learning model, the operational context of the target machine learning model, the types and/or formats of data candidates in the raw dataset, the types and/or formats of ground-truth annotations in the raw dataset, and/or any other suitable factors. In some cases, a "clean" candidate-annotation grouping can be a candidate-annotation grouping that satisfies one or more qualitative (as opposed to quantitative) criteria for training suitability that are established by human operators. In contrast, an "unclean" candidate-annotation grouping can be a candidate-annotation grouping that fails to satisfy at least one of the one or more qualitative criteria for training suitability. As those having ordinary skill in the art will understand, such qualitative criteria can often be manually evaluated by a human operator but often cannot be explicitly quantified into numerical rules/metrics that are amendable to automation.

Consider the following non-limiting example, where the target task to be performed by the target machine learning model is X-ray image quality improvement. In such case, each data candidate in the raw dataset can be an X-ray image, and each ground-truth annotation can be an improved version of a corresponding X-ray image. In such case, a particular candidate-annotation grouping, comprising a particular data candidate (e.g., lower-quality X-ray image) and a particular ground-truth annotation (e.g., higher-quality X-ray image), can be considered as clean if: (1) the particular ground-truth annotation (e.g., higher-quality X-ray image) exhibits an improved contrast resolution as compared to the particular data candidate (e.g., lower-quality X-ray image); (2) the particular ground-truth annotation (e.g., higher-quality X-ray image) exhibits less noise as compared to the particular data candidate (e.g., lower-quality X-ray image); (3) the particular ground-truth annotation (e.g., higher-quality X-ray image) exhibits a same and/or similar speckle pattern as compared to the particular data candidate (e.g., lower-quality X-ray image); and (4) each subarea structure (e.g., tissue, bone, organ) depicted in the particular ground-truth annotation (e.g., higher-quality X-ray image) is also depicted in the particular data candidate (e.g., lower-quality X-ray image).

In this non-limiting example, qualitative criteria (1) and (2) can help to ensure that the particular ground-truth annotation (e.g., higher-quality X-ray image) really is an improved version of the particular data candidate (e.g., lower-quality X-ray image), qualitative criterion (3) can help to ensure that the particular ground-truth annotation (e.g., higher-quality X-ray image) is still comparable to and/or not excessively different from the particular data candidate (e.g., lower-quality X-ray image); and qualitative criterion (4) can help to ensure that the target machine learning model does not learn to generate image features from pure noise. Note that it can be difficult, if not impossible, to explicitly define numerical metrics that can fully capture and/or implement some of these qualitative criteria, especially qualitative criterion (4). Specifically, although contrast-to-noise ratio and/or signal-to-noise ratio can be used to evaluate qualitative criteria (1) and (2), there are no quantitative metrics that can be used to reliably evaluate qualitative criteria (3) and (4). Regardless of the lack of reliable quantifiable metrics, these qualitative criteria can be implicitly learned by the data selection machine learning model (e.g., during supervised training of the data selection machine learning model, described below), with the result being that the data selection machine learning model is able to accurately distinguish clean candidate-annotation groupings from unclean candidate-annotation groupings. In other words, the data selection machine learning model can automate the clean data selection process, notwithstanding the inability and/or impossibility of explicitly quantifying the above-mentioned qualitative criteria.

In various embodiments, the training component of the computerized tool can electronically train the target machine learning model on the clean dataset. More specifically, the internal parameters (e.g., weights and/or biases) of the target machine learning model can be randomly initialized. In various aspects, for each clean candidate-annotation grouping in the clean dataset, the training component can feed as input to the target machine learning model a clean data candidate of the clean candidate-annotation grouping, which can cause the target machine learning model to generate some output based on the clean data candidate. As those having ordinary skill in the art will understand, the output generated by the target machine learning model can correspond to the target task (e.g., the output can be a classification label if the target task is data classification; the output can be a segmentation mask if the target task is data segmentation). In various instances, the training component can then compute an error/loss between the output and the clean ground-truth annotation of the clean candidate-annotation grouping. Note that, if the target machine learning model has undergone no and/or little training, the error/loss can be large. In various aspects, the training component can update, via backpropagation, the internal parameters of the target machine learning model based on the error/loss. In various cases, the training component can repeat this procedure for each clean candidate-annotation grouping in the clean dataset, with the result being that the internal parameters of the target machine learning model are iteratively optimized to perform the target task. As those having ordinary skill in the art will appreciate, the training component can implement any suitable batch sizes and/or any suitable number of training epochs to iteratively update the parameters of the target machine learning model based on the clean dataset.

In various embodiments, the inferencing component of the computerized tool can electronically deploy the target machine learning model after training on the clean dataset. That is, in various aspects, the inferencing component can electronically execute the target machine learning model on any suitable set of data candidates, after the internal parameters of the target machine learning model are iteratively optimized via training on the clean dataset by the training component.

In various embodiments, prior to utilizing the data selection machine learning model to select the clean dataset from the raw dataset, the computerized tool can train the data selection machine learning model, as described herein. Specifically, in various cases, the receiver component can electronically receive and/or otherwise electronically access a manually-labeled training dataset. In various aspects, the manually-labeled training dataset can comprise any suitable number of training candidate-annotation groupings, with each training candidate-annotation grouping comprising a training data candidate and a training ground-truth annotation, and with each training candidate-annotation grouping corresponding to a manually-selected clean/unclean label. In other words, a human operator (e.g., subject matter expert) can have inspected, viewed, and/or considered each training candidate-annotation grouping and can have manually labeled each training candidate-annotation grouping as either clean (e.g., suitable for training of the target machine learning model) or unclean (e.g., unsuitable for training of the target machine learning model).

Accordingly, in various instances, the training component can train the data selection machine learning model on the manually-labeled training dataset. More specifically, the internal parameters (e.g., weights and/or biases) of the data selection machine learning model can be randomly initialized. In various aspects, for each training candidate-annotation grouping in the manually-labeled training dataset, the training component can feed as input to the data selection machine learning model the training candidate-annotation grouping, which can cause the data selection machine learning model to generate a clean/unclean label based on the training candidate-annotation grouping. In various instances, the training component can then compute an error/loss between the clean/unclean label generated by the data selection machine learning model and the manually-selected clean/unclean label corresponding to the training candidate-annotation grouping. Note that, if the data selection machine learning model has undergone no and/or little training, the error/loss can be large. In various aspects, the training component can update, via backpropagation, the internal parameters of the data selection machine learning model based on the error/loss. In various cases, the training component can repeat this procedure for each training candidate-annotation grouping in the manually-labeled training dataset, with the result being that the internal parameters of the data selection machine learning model are iteratively optimized to distinguish clean candidate-annotation groupings from unclean candidate-annotation groupings (e.g., to distinguish candidate-annotation groupings that are suitable and/or acceptable to train the target machine learning model from those that are not suitable and/or acceptable to train the target machine learning model). As those having ordinary skill in the art will appreciate, the training component can implement any suitable batch sizes and/or any suitable number of training epochs to iteratively update the parameters of the data selection machine learning model based on the manually-labeled training dataset.

Note that, in this way, the data selection machine learning model can be trained to accurately tell clean candidate-annotation groupings apart from unclean candidate-annotation groupings, without requiring the explicit quantification of numerical metrics that distinguish clean candidate-annotation groupings from unclean candidate-annotation groupings. Instead, the data selection machine learning model can learn how to tell clean from unclean candidate-annotation groupings via supervised training (e.g., by being shown examples of candidate-annotation groupings that are manually deemed as clean and other examples of candidate-annotation groupings that are manually deemed as unclean). As those having ordinary skill in the art will appreciate, in some cases, other training paradigms can be implemented to train the data selection machine learning model (e.g., unsupervised training, reinforcement learning). Even with such other training paradigms, the data selection machine learning model can learn to distinguish clean candidate-annotation groupings from unclean candidate-annotation groupings, without relying upon explicit definitions of quantifiable clean-vs.-unclean metrics. Accordingly, once trained, the data selection machine learning model can be implemented to perform clean data selection with respect to the target task on any suitable number of raw datasets of any suitable sizes.

In various aspects, the computerized tool described herein can electronically receive a raw dataset, can electronically select a clean dataset from the raw dataset by executing a trained data selection machine learning model, can electronically train a target machine learning model on the clean dataset, and can electronically execute and/or deploy the target machine learning model after training. Moreover, the computerized tool can facilitate such functionality without requiring explicit numerical metrics that define clean data and/or unclean data.

Various embodiments of the subject innovation can be employed to use hardware and/or software to solve problems that are highly technical in nature (e.g., to facilitate learning-based clean data selection), that are not abstract and that cannot be performed as a set of mental acts by a human. Further, some of the processes performed can be performed by a specialized computer (e.g., data selection machine learning model, target machine learning model) for carrying out defined tasks related to learning-based clean data selection. For example, such defined tasks can include: accessing, by a device operatively coupled to a processor, a raw dataset; selecting, by the device and via execution of a data selection machine learning model, a clean dataset from the raw dataset; and training, by the device, a target machine learning model to perform a target task on the clean dataset. In some cases, such defined tasks can further include: deploying and/or inferencing, by the device, the target machine learning model after training. Such defined tasks are not performed manually by humans. Indeed, neither the human mind nor a human with pen and paper can electronically receive a raw dataset, can electronically execute a data selection machine learning model on the raw dataset to generate a clean dataset, can electronically train via backpropagation a target machine learning model on the clean dataset, and/or can electronically deploy the target machine learning model after training. Instead, various embodiments of the subject innovation are inherently and inextricably tied to computer technology and cannot be implemented outside of a computing environment (e.g., machine learning models are concrete and tangible combinations of computer-executable hardware and/or computer-executable software; thus, a computerized tool that executes a data selection machine learning model to filter a raw dataset and that trains a target machine learning model on the filtered dataset is itself an inherently-computerized device that cannot be practicably implemented in any sensible way without computers).

Moreover, various embodiments of the subject innovation can integrate into a practical application various teachings described herein relating to the field of clean data selection. As explained above, some existing data selection techniques include manual inspection. Unfortunately, manual inspection can be time-consuming and/or inconsistent. Other existing data selection techniques can include rule-based filtration. Unfortunately, rule-based filtration requires explicitly quantified metrics for distinguishing clean from unclean data. Such explicitly quantified metrics are often not available. Even when such explicitly quantified metrics are available, they often fail to fully and/or accurately capture the distinction between clean and unclean data. In stark contrast, learning-based clean data selection as described herein can involve a data selection machine learning model that is configured/trained to label data as either clean or unclean. Such a technique is much more efficient, consistent, and scalable as compared to manual inspection. Moreover, such a technique does not rely upon the explicit quantification of numerical metrics for differentiating clean data from unclean data. Instead, the data selection machine learning model can have any suitable artificial intelligence architecture (e.g., deep learning neural network) that can be trained (e.g., via backpropagation) in a supervised fashion to differentiate clean data from unclean data. In other words, the data selection machine learning model can learn to distinguish clean and unclean data based on manually-selected examples of clean and unclean data, and thus does not rely upon the explicitly quantified numerical metrics that bog down rule-based filtration techniques. Accordingly, the computerized tool described herein can be considered as a concrete and tangible technical improvement in the field of clean data selection, and thus clearly constitutes a useful and practical application of computers.

Furthermore, various embodiments of the subject innovation can control real-world tangible devices based on the disclosed teachings. For example, various embodiments of the subject innovation can electronically execute a real-world data selection machine learning model on a real-world raw dataset so as to generate a real-world clean dataset, can electronically train a real-world target machine learning model on the real-world clean dataset, and/or can electronically deploy the real-world target machine learning model in any suitable operational context after training.

It should be appreciated that the herein figures and description provide non-limiting examples of the subject innovation and are not necessarily drawn to scale.

FIG. 1 illustrates a block diagram of an example, non-limiting system 100 that can facilitate learning-based clean data selection in accordance with one or more embodiments described herein. As shown, in various aspects, a learning-based clean data selection system 102 can be electronically integrated, via any suitable wired and/or wireless electronic connection, with a raw dataset 104.

In various instances, the raw dataset 104 can be intended to train a machine learning model to perform a target task. Accordingly, in various cases, the raw dataset 104 can comprise any suitable number of candidate-annotation groupings. In various aspects, a candidate-annotation grouping can include a data candidate and an annotation that respectively corresponds to the data candidate. In various aspects, a data candidate can be one or more scalars, one or more vectors, one or more matrices, one or more tensors, one or more character strings, and/or any suitable combination thereof. For example, a data candidate can be an image, which can be a two-dimensional matrix of pixel values and/or a three-dimensional tensor of voxel values. As another example, a data candidate can be a video, which can be a timeseries of images. As still another example, a data candidate can be a sound recording, which can be a timeseries of pressure data and/or volume data. As yet another example, a data candidate can be a vector of metadata that describes any suitable object, event, and/or entity (e.g., a vector describing the weather of a given location over a given time period, a vector describing the demographics and/or transaction history of a given customer, a vector describing the characteristics of given vehicle). In various instances, an annotation that corresponds to a particular data candidate can be one or more scalars, one or more vectors, one or more matrices, one or more tensors, one or more character strings, and/or any suitable combination thereof that indicates and/or otherwise represents a correct, accurate, and/or ground-truth result that is obtained when the target task is performed on the particular data candidate. Accordingly, the format and/or content of an annotation can depend upon the target task (e.g., if the target task is classification, an annotation of a given data candidate can be a correct classification label of the given data candidate; if the target task is segmentation, an annotation of a given data candidate can be a correct segmentation mask of the given data candidate).

In various cases, it can be desired to filter out unclean (e.g., unsuitable for training) candidate-annotation groupings from the raw dataset 104. As explained herein, the learning-based clean data selection system 102 can facilitate such functionality.

In various embodiments, the learning-based clean data selection system 102 can comprise a processor 106 (e.g., computer processing unit, microprocessor) and a computer-readable memory 108 that is operably and/or operatively and/or communicatively connected/coupled to the processor 106. The computer-readable memory 108 can store computer-executable instructions which, upon execution by the processor 106, can cause the processor 106 and/or other components of the learning-based clean data selection system 102 (e.g., receiver component 110, selection component 112, training component 114, inferencing component 116) to perform one or more acts. In various embodiments, the computer-readable memory 108 can store computer-executable components (e.g., receiver component 110, selection component 112, training component 114, inferencing component 116), and the processor 106 can execute the computer-executable components.

In various embodiments, the learning-based clean data selection system 102 can comprise a receiver component 110. In various aspects, the receiver component 110 can electronically receive and/or otherwise electronically access the raw dataset 104. In various instances, the receiver component 110 can electronically retrieve the raw dataset 104 from any suitable data structure and/or database (not shown), whether centralized and/or decentralized, and/or whether remote from and/or local to the receiver component 110. In various other instances, the receiver component 110 can electronically retrieve and/or receive the raw dataset 104 from any other suitable computing device (not shown). In any case, the receiver component 110 can electronically obtain and/or access the raw dataset 104, such that other components of the learning-based clean data selection system 102 can electronically interact with the raw dataset 104.

In various embodiments, the learning-based clean data selection system 102 can comprise a selection component 112. In various aspects, the selection component 112 can electronically maintain and/or otherwise electronically control a data selection machine learning model. In various instances, the selection component 112 can electronically generate a clean dataset, by executing the data selection machine learning model on the raw dataset 104. More specifically, the data selection machine learning model can be any suitable artificial intelligence algorithm (e.g., a deep learning model) that is configured to receive as input a candidate-annotation grouping from the raw dataset 104 and to produce as output a label that classifies the inputted candidate-annotation grouping as either clean or unclean. If the data selection machine learning model labels a particular candidate-annotation grouping as clean, this can indicate that the particular candidate-annotation grouping is suitable to be used to train some other machine learning model to perform the target task. On the other hand, if the data selection machine learning model labels a particular candidate-annotation grouping as unclean, this can indicate that the particular candidate-annotation grouping is not suitable to be used to train some other machine learning model to perform the target task. Accordingly, the selection component 112 can eliminate from the raw dataset 104 any candidate-annotation grouping that is labeled as unclean, and/or the selection component 112 can retain in the raw dataset 104 any candidate-annotation grouping that is labeled as clean. Thus, the result can be a clean dataset that includes only clean candidate-annotation groupings and that excludes unclean candidate-annotation groupings.

As explained herein, the data selection machine learning model can be pre-trained via supervised learning to accurately classify candidate-annotation groupings as either clean or unclean. In other words, the data selection machine learning model can learn how to distinguish clean candidate-annotation groupings from unclean candidate-annotations groupings by being shown known examples. Thus, there is no need for explicit quantification of numerical metrics to define the distinction between clean candidate-annotation groupings and unclean candidate-annotation groupings.

In various embodiments, the learning-based clean data selection system 102 can comprise a training component 114. In various aspects, the training component 114 can electronically maintain and/or otherwise electronically control a target machine learning model. In various instances, the training component 114 can electronically train the target machine learning model on the clean dataset generated by the selection component 112. More specifically, the training component 114 can select a clean candidate-annotation grouping from the clean dataset, where the clean candidate-annotation grouping includes a clean data candidate and a clean annotation. In various cases, the training component 114 can electronically input the clean data candidate into the target machine learning model, which can cause the target machine learning model to generate some output based on the clean data candidate, where the output corresponds to the target task. In various aspects, the training component 114 can electronically compute an error/loss between the output generated by the target machine learning model and the clean annotation. Accordingly, the training component 114 can update, via backpropagation, the internal parameters of the target machine learning model based on the error/loss. In various cases, the training component 114 can repeat this for each clean candidate-annotation grouping in the clean dataset, which can ultimately cause the internal parameters of the target machine learning model to become iteratively optimized to perform the target task.

In various embodiments, the learning-based clean data selection system 102 can comprise an inferencing component 116. In various aspects, the inferencing component 116 can electronically execute the target machine learning model, after training by the training component 114, on any suitable set of deployed data candidates (e.g., on any suitable data candidates that are encountered during deployment and/or in a commercial, industrial, operational, and/or otherwise non-training context). More specifically, the receiver component 110 can electronically receive and/or access one or more data candidates that are encountered during deployment, and the inferencing component 116 can electronically execute the target machine learning mode on the one or more data candidates, after the target machine learning model has been trained, such that the target machine learning model accurately performs the target task on the one or more data candidates.

In various embodiments, to generate the clean dataset, the data selection machine learning model can itself require training. In various aspects, the receiver component 110 can electronically receive, retrieve, and/or otherwise access a manually-labeled training dataset, which can be used to train the data selection machine learning model. In various instances, the manually-labeled training dataset can comprise any suitable number of training candidate-annotation groupings, with each training candidate-annotation grouping respectively corresponding to a manually-selected label that indicates whether the training candidate-annotation grouping is clean (e.g., suitable to train a model to perform the target task) or unclean (e.g., unsuitable to train a model to perform the target task). That is, a subject matter expert can manually inspect each training candidate-annotation grouping in the manually-labeled training dataset, and can manually determine whether any given training candidate-annotation grouping is clean or unclean. Accordingly, the training component 114 can train, in a supervised manner and via backpropagation, the data selection machine learning model on the manually-labeled training dataset. More specifically, the training component 114 can select a training candidate-annotation grouping from the manually-labeled training dataset. In various cases, the training component 114 can electronically input the training candidate-annotation grouping into the data selection machine learning model, which can cause the data selection machine learning model to generate a label that classifies the training candidate-annotation grouping as either clean or unclean. In various aspects, the training component 114 can electronically compute an error/loss between the label generated by the data selection machine learning model and the manually-created label that corresponds to the training candidate-annotation grouping. Accordingly, the training component 114 can update, via backpropagation, the internal parameters of the data selection machine learning model based on the error/loss. In various cases, the training component 114 can repeat this for each training candidate-annotation grouping in the manually-labeled training dataset, which can ultimately cause the internal parameters of the data selection machine learning model to become iteratively optimized to distinguish clean candidate-annotation groupings from unclean candidate-annotation groupings.

In this way, the data selection machine learning model can learn how to distinguish clean candidate-annotation groupings from unclean candidate-annotation groupings, without requiring any explicit and/or quantifiable metrics for doing so.

Figure 2:
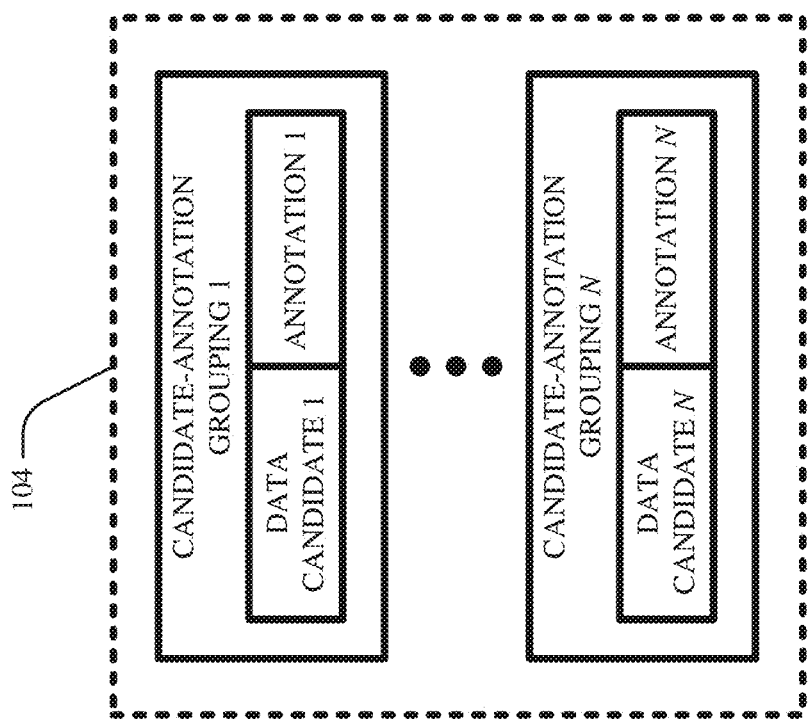
FIG. 2 illustrates a block diagram of an example, non-limiting raw dataset in accordance with one or more embodiments described herein.

FIG. 2 illustrates a block diagram 200 of an example, non-limiting raw dataset in accordance with one or more embodiments described herein. In other words, FIG. 2 illustrates an example and non-limiting embodiment of the raw dataset 104.

As shown, the raw dataset 104 can, in various aspects, comprise n candidate-annotation groupings, for any suitable positive integer n. That is, the raw dataset 104 can comprise a candidate-annotation grouping 1 to a candidate-annotation grouping n. In various instances, as shown, the candidate-annotation grouping 1 can include a data candidate 1 and an annotation 1. In various cases, the data candidate 1 can be any suitable piece of data as desired. In other words, the data candidate 1 can be one or more scalars, one or more vectors, one or more matrices, one or more tensors, one or more character strings, and/or any suitable combination thereof. In accordance with some of the aforementioned examples, the data candidate 1 can be an image, a video, a sound recording, and/or any other suitable piece of data on which the target task can be performed. In various aspects, the annotation 1 can be any suitable piece of data (e.g., one or more scalars, one or more vectors, one or more matrices, one or more tensors, one or more character strings, and/or any suitable combination thereof) that is concatenated with, linked to, and/or otherwise associated with the data candidate 1. More specifically, the annotation 1 can represent and/or indicate a correct, accurate, and/or ground-truth result that is obtained when the target task is performed on the data candidate 1. For example, if the target task is data classification, the annotation 1 can be a ground-truth classification label that corresponds to the data candidate 1. As another example, if the target task is data segmentation, the annotation 1 can be a ground-truth segmentation mask that corresponds to the data candidate 1. Accordingly, those having ordinary skill in the art will appreciate that the format and/or dimensionality of the annotation 1 can depend upon the format and/or dimensionality of the data candidate 1 and/or can depend upon the target task.

Similarly, in various aspects as shown, the candidate-annotation grouping n can include a data candidate n and an annotation n. In various aspects, the data candidate n can be any suitable piece of data as desired. That is, the data candidate n can be one or more scalars, one or more vectors, one or more matrices, one or more tensors, one or more character strings, and/or any suitable combination thereof. In some cases, the data candidate n can have a same format and/or dimensionality as the data candidate 1 (e.g., if the data candidate 1 is an image, the data candidate n can likewise be an image; if the data candidate 1 is a sound recording, the data candidate n can likewise be a sound recording). In various aspects, the annotation n can be any suitable piece of data (e.g., one or more scalars, one or more vectors, one or more matrices, one or more tensors, one or more character strings, and/or any suitable combination thereof) that is concatenated with, linked to, and/or otherwise associated with the data candidate n. More specifically, the annotation n can represent and/or indicate a correct, accurate, and/or ground-truth result that is obtained when the target task is performed on the data candidate n. In various cases, the format and/or dimensionality of the annotation n can be the same as the format and/or dimensionality of the annotation 1 (e.g., if the annotation 1 is a classification label, the annotation n can likewise be a classification label; if the annotation 1 is a segmentation mask, the annotation n can likewise be a segmentation mask).

Figure 3:
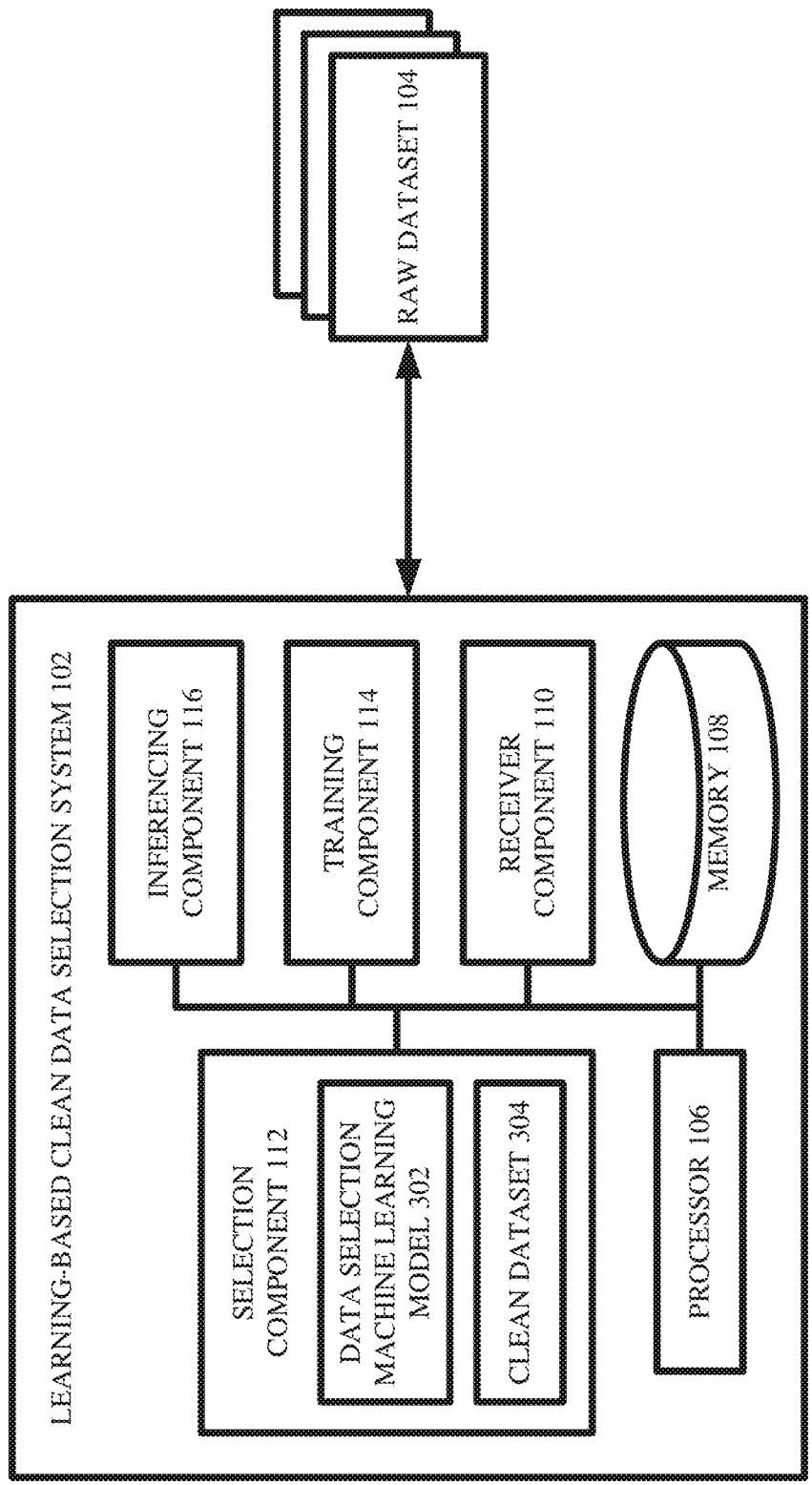
FIG. 3 illustrates a block diagram of an example, non-limiting system including a data selection machine learning model and a clean dataset that facilitates learning-based clean data selection in accordance with one or more embodiments described herein.

FIG. 3 illustrates a block diagram of an example, non-limiting system 300 including a data selection machine learning model and a clean dataset that can facilitate learning-based clean data selection in accordance with one or more embodiments described herein. As shown, the system 300 can, in some cases, comprise the same components as the system 100, and can further comprise a data selection machine learning model 302 and/or a clean dataset 304.

In various embodiments, the selection component 112 can electronically store, maintain, control, operate, and/or otherwise access the data selection machine learning model 302. In various aspects, the data selection machine learning model 302 can exhibit any suitable artificial intelligence architecture. For example, in some instances, the data selection machine learning model 302 can be a deep learning neural network. In such case, the data selection machine learning model 302 can comprise any suitable number of layers, can comprise any suitable numbers of neurons in various layers (e.g., different layers can have different numbers of neurons), can comprise any suitable activation functions (e.g., softmax, sigmoid, hyperbolic tangent, rectified linear unit), and/or can comprise any suitable interneuron connectivity patterns (e.g., forward connections, recurrent connections, skip connections). However, this is a mere non-limiting example. In various cases, the data selection machine learning model 302 can exhibit any other suitable artificial intelligence architecture as desired. For instance, the data selection machine learning model 302 can be a regression model, a naïve Bayes model, and/or a support vector machine.

In any case, the data selection machine learning model 302 can be configured to distinguish clean candidate-annotation groupings from unclean candidate-annotation groupings. More specifically, the data selection machine learning model 302 can be configured to receive as input a candidate-annotation grouping and to produce as output a classification label that indicates whether the inputted candidate-annotation grouping is clean (e.g., suitable to be used to train some other model to perform the target task) or unclean (e.g., unsuitable to be used to train some other model to perform the target task). As explained herein and in more detail below with respect to FIGS. 12-15, the data selection machine learning model 302 can be trained in a supervised fashion to accurately produce such clean-vs.-unclean classifications. Accordingly, in various instances, the selection component 112 can electronically execute the data selection machine learning model 302 on each of the candidate-annotation groupings in the raw dataset 104, such that each candidate-annotation grouping in the raw dataset 104 has a corresponding label that indicates whether it is clean or unclean. In various aspects, the selection component 112 can then instantiate the clean dataset 304 as an empty set and can insert into the clean dataset 304 every candidate-annotation grouping that is in the raw dataset 104 and that is labeled as clean. In other words, the clean dataset 304 can exclude every candidate-annotation grouping that is in the raw dataset 104 and that is labeled as unclean. This is explained further with respect to FIGS. 4-5.

Figure 4:
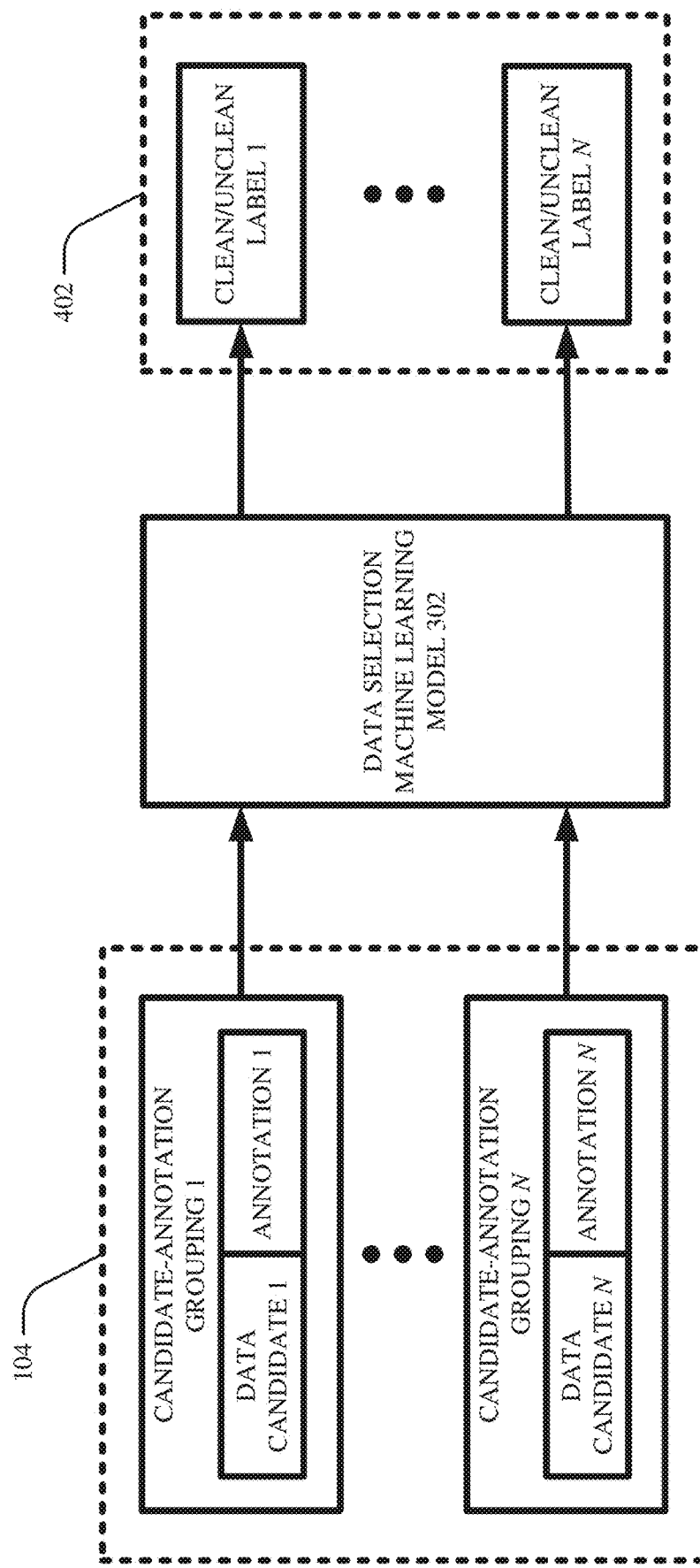
FIG. 4 illustrates a block diagram showing, in an example and non-limiting way, how a data selection machine learning model can analyze a raw dataset in accordance with one or more embodiments described herein.

FIG. 4 illustrates a block diagram 400 showing, in an example and non-limiting way, how the data selection machine learning model 302 can analyze the raw dataset 104 in accordance with one or more embodiments described herein.

As shown, in various cases, the selection component 112 can electronically execute the data selection machine learning model 302 on each candidate-annotation grouping in the raw dataset 104, thereby yielding a set of clean/unclean labels 402. More specifically, in various aspects, the selection component 112 can electronically feed the candidate-annotation grouping 1 to the data selection machine learning model 302. This can cause the data selection machine learning model 302 to generate a clean/unclean label 1, which can be based on and/or otherwise correspond to the candidate-annotation grouping 1. In some cases, the clean/unclean label 1 can indicate that the candidate-annotation grouping 1 is clean, meaning that the candidate-annotation grouping 1 is suitable to be used to train some other model to perform the target task. In other cases, the clean/unclean label 1 can indicate that the candidate-annotation grouping 1 is unclean, meaning that the candidate-annotation grouping 1 is not suitable to be used to train some other model to perform the target task. In similar fashion, the selection component 112 can electronically feed the candidate-annotation grouping n to the data selection machine learning model 302. This can cause the data selection machine learning model 302 to generate a clean/unclean label n, which can be based on and/or otherwise correspond to the candidate-annotation grouping n. In some cases, the clean/unclean label n can indicate that the candidate-annotation grouping n is clean, meaning that the candidate-annotation grouping n is suitable to be used to train some other model to perform the target task. In other cases, the clean/unclean label n can indicate that the candidate-annotation grouping n is unclean, meaning that the candidate-annotation grouping n is not suitable to be used to train some other model to perform the target task.

Those having ordinary skill in the art will appreciate that, in some cases, the data selection machine learning model 302 can be configured to operate on one candidate-annotation grouping at a time (e.g., can be configured to receive as input one candidate-annotation grouping and to produce as output one clean/unclean label at any given time). Those having ordinary skill in the art will further appreciate that, in other cases, the data selection machine learning model 302 can be configured to operate on multiple candidate-annotation groupings at a time (e.g., can be configured to receive as input more than one candidate-annotation grouping and to produce as output more than one clean/unclean label at any given time).

Figure 5:
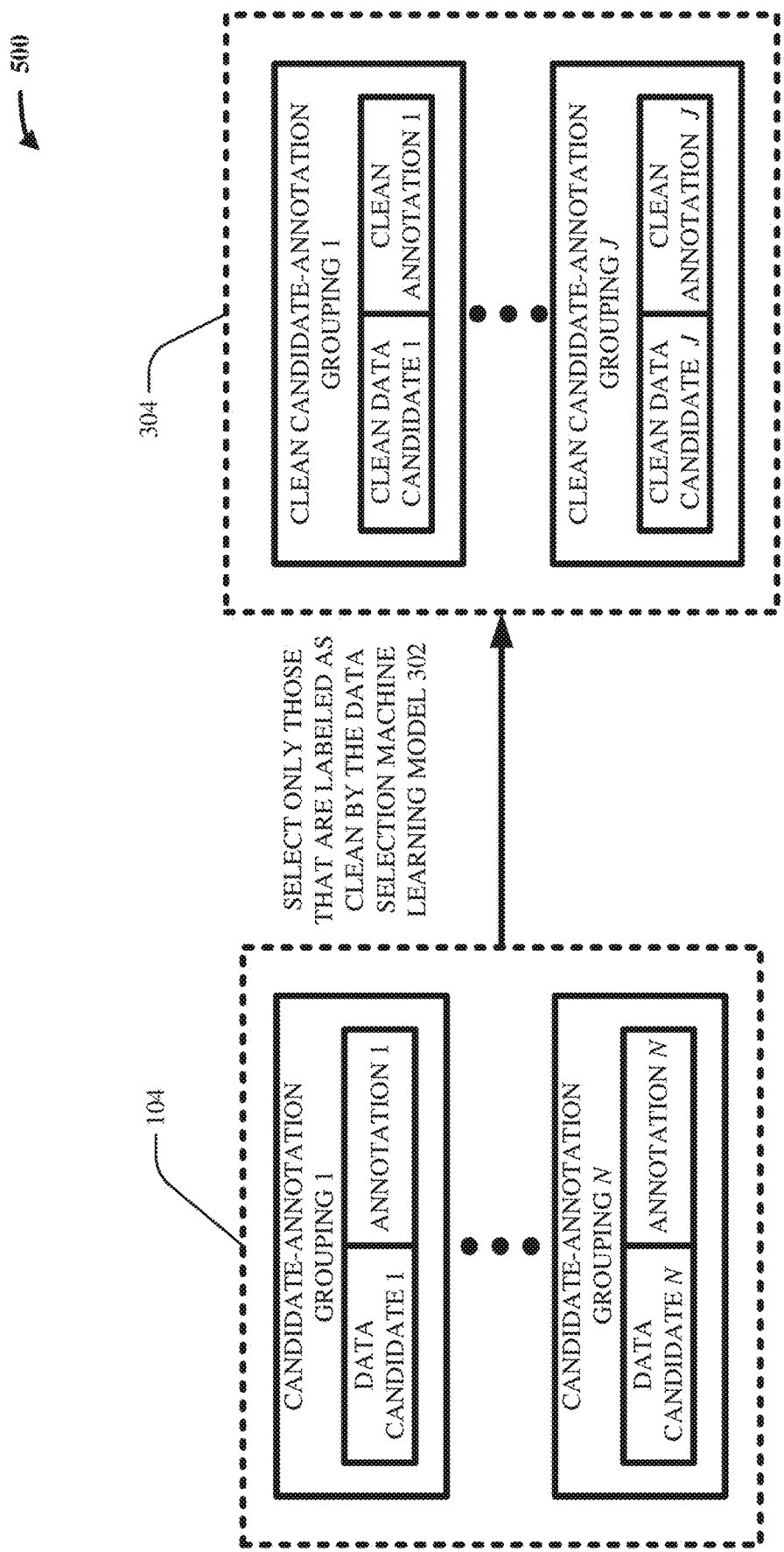
FIG. 5 illustrates a block diagram showing, in an example and non-limiting way, how a clean dataset can be selected from a raw dataset via a data selection machine learning model in accordance with one or more embodiments described herein.

FIG. 5 illustrates a block diagram 500 showing, in an example and non-limiting way, how the clean dataset 304 can be selected from the raw dataset 104 via the data selection machine learning model 302 in accordance with one or more embodiments described herein.

As explained above, the data selection machine learning model 302 can generate the set of clean/unclean labels 402 based on the raw dataset 104. In various instances, the selection component 112 can leverage the set of clean/unclean labels 402 so as to derive the clean dataset 304 from the raw dataset 104. More specifically, in various aspects, the selection component 112 can eliminate from the raw dataset 104 any candidate-annotation grouping that has been labeled as unclean by the data selection machine learning model 302, and can retain in the raw dataset 104 any candidate-annotation grouping that has been labeled as clean by the data selection machine learning model 302. The result of such elimination and/or retention can be the clean dataset 304.

As shown, the clean dataset 304 can comprise j clean candidate-annotation groupings, for any suitable positive integer j that is less than and/or equal to n. In other words, the clean dataset 304 can be a subset of the raw dataset 104, and can contain all candidate-annotation groupings that are labeled as clean by the data selection machine learning model 302 (e.g., can contain all candidate-annotation groupings in the raw dataset 104 that are suitable for training a model to perform the target task). Thus, the clean dataset 304 can include a clean candidate-annotation grouping 1 to a clean candidate-annotation grouping j. As shown, the clean candidate-annotation grouping 1 can include a clean data candidate 1 and a clean annotation 1, and the clean candidate-annotation grouping j can include a clean data candidate j and a clean annotation j.

Figure 6:
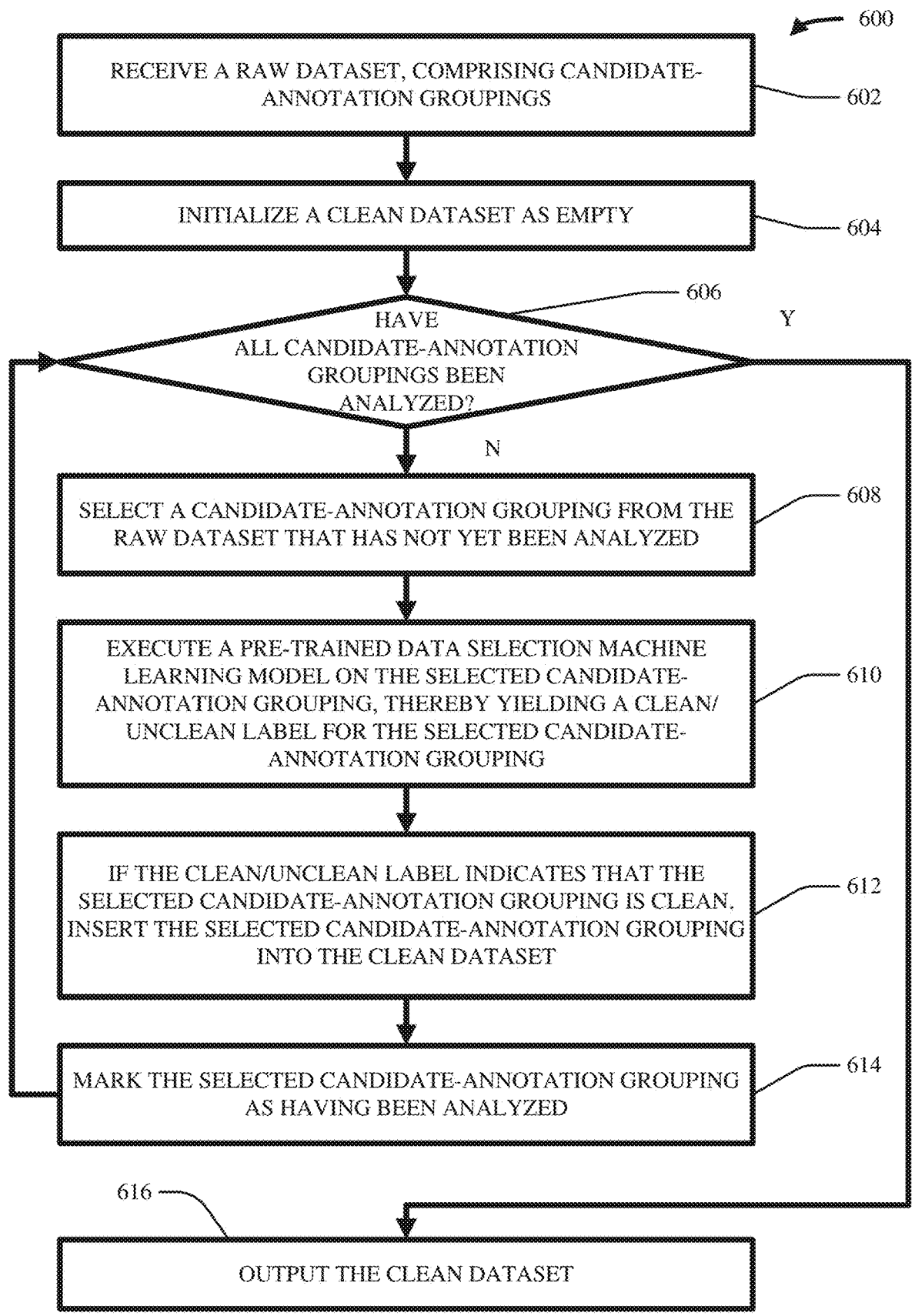
FIG. 6 illustrates a flow diagram of an example, non-limiting computer-implemented method that facilitates clean dataset selection in accordance with one or more embodiments described herein.

FIG. 6 illustrates a flow diagram of an example, non-limiting computer-implemented method 600 that can facilitate clean dataset selection in accordance with one or more embodiments described herein. In other words, the computer-implemented method 600 can show how the selection component 112 can generate the clean dataset 304 from the raw dataset 104.

In various embodiments, act 602 can include receiving, by a device (e.g., 112) operatively coupled to a processor, a raw dataset (e.g., 104), comprising candidate-annotation groupings.

In various aspects, act 604 can include initializing, by the device (e.g., 112), a clean dataset (e.g., 304) as empty.

In various instances, act 606 can include determining, by the device (e.g., 112), whether all candidate-annotation groupings in the raw dataset have been analyzed by the device. If so, the computer-implemented method 600 can proceed to act 616. If not, the computer-implemented method 600 can proceed to act 608.

In various cases, act 608 can include selecting, by the device (e.g., 112), a candidate-annotation grouping from the raw dataset that has not yet been analyzed by the device.

In various aspects, act 610 can include executing, by the device (e.g., 112), a pre-trained data selection machine learning model (e.g., 302) on the selected candidate-annotation grouping. This can yield a clean/unclean label for the selected candidate-annotation grouping.

In various instances, act 612 can include, if the clean/unclean label indicates that the selected candidate-annotation grouping is clean, inserting, by the device (e.g., 112), the selected candidate-annotation grouping into the clean dataset.

In various cases, act 614 can include marking, by the device (e.g., 112), the selected candidate-annotation grouping as having been analyzed by the device. In various aspects, the computer-implemented method 600 can then proceed back to act 606.

In various instances, act 616 can include outputting, by the device (e.g., 112), the clean dataset.

As shown, acts 606-614 can iterate until all candidate-annotation groupings in the raw dataset have been assigned a clean/unclean label, and until each candidate-annotation grouping that is labeled as clean is inserted into the clean dataset.

As those having ordinary skill in the art will appreciate, FIGS. 3-6 can be considered as illustrating how the data selection machine learning model 302 can operate during inferencing (e.g., after the data selection machine learning model 302 has already been trained, which training is described below with respect to FIGS. 12-15).

Figure 7:
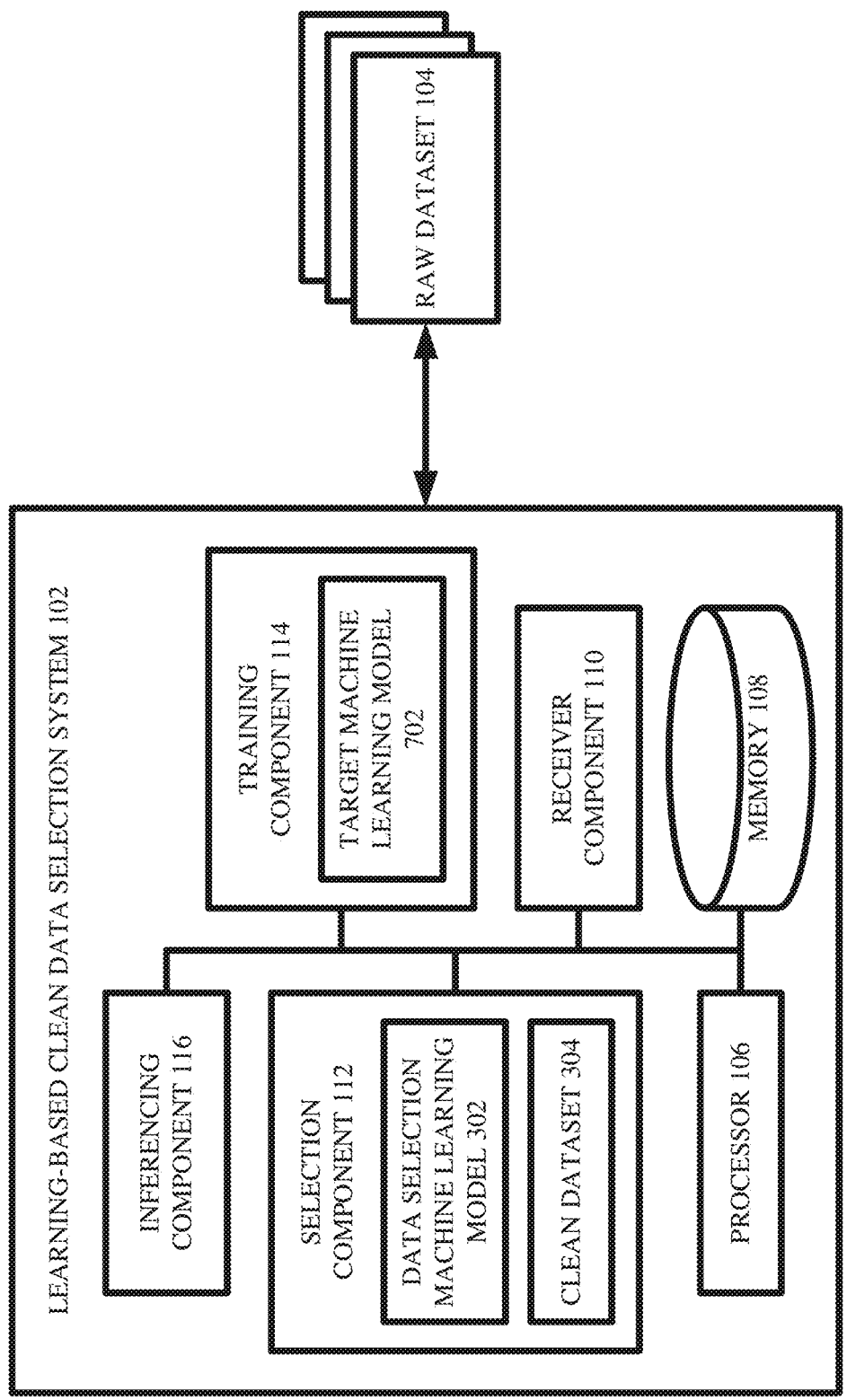
FIG. 7 illustrates a block diagram of an example, non-limiting system including a target machine learning model that facilitates learning-based clean data selection in accordance with one or more embodiments described herein.

FIG. 7 illustrates a block diagram of an example, non-limiting system 700 including a target machine learning model that can facilitate learning-based clean data selection in accordance with one or more embodiments described herein. As shown, the system 700 can, in some cases, comprise the same components as the system 300, and can further comprise a target machine learning model 702.

In various embodiments, the training component 114 can electronically store, maintain, control, operate, and/or otherwise access the target machine learning model 702. In various aspects, the target machine learning model 702 can exhibit any suitable artificial intelligence architecture. For example, in some instances, the target machine learning model 702 can be a deep learning neural network. In such case, the target machine learning model 702 can comprise any suitable number of layers, can comprise any suitable numbers of neurons in various layers (e.g., different layers can have different numbers of neurons), can comprise any suitable activation functions (e.g., softmax, sigmoid, hyperbolic tangent, rectified linear unit), and/or can comprise any suitable interneuron connectivity patterns (e.g., forward connections, recurrent connections, skip connections). However, this is a mere non-limiting example. In various cases, the target machine learning model 702 can exhibit any other suitable artificial intelligence architecture as desired. For instance, the target machine learning model 702 can be a regression model, a naïve Bayes model, and/or a support vector machine.

In any case, the target machine learning model 702 can be configured to perform the target task on data candidates. More specifically, the target machine learning model 702 can be configured to receive as input a data candidate and to produce some output that corresponds to the target task based on the inputted data candidate (e.g., if the target task is data classification, the output can be a classification label; if the target task is data segmentation, the output can be a segmentation mask). In various aspects, the target machine learning model 702 can be trained in a supervised fashion to accurately perform the target task on inputted data candidates. Indeed, in various instances, the training component 114 can electronically train the target machine learning model 702 on the clean dataset 304. This is explained further with respect to FIG. 8.

Figure 8:
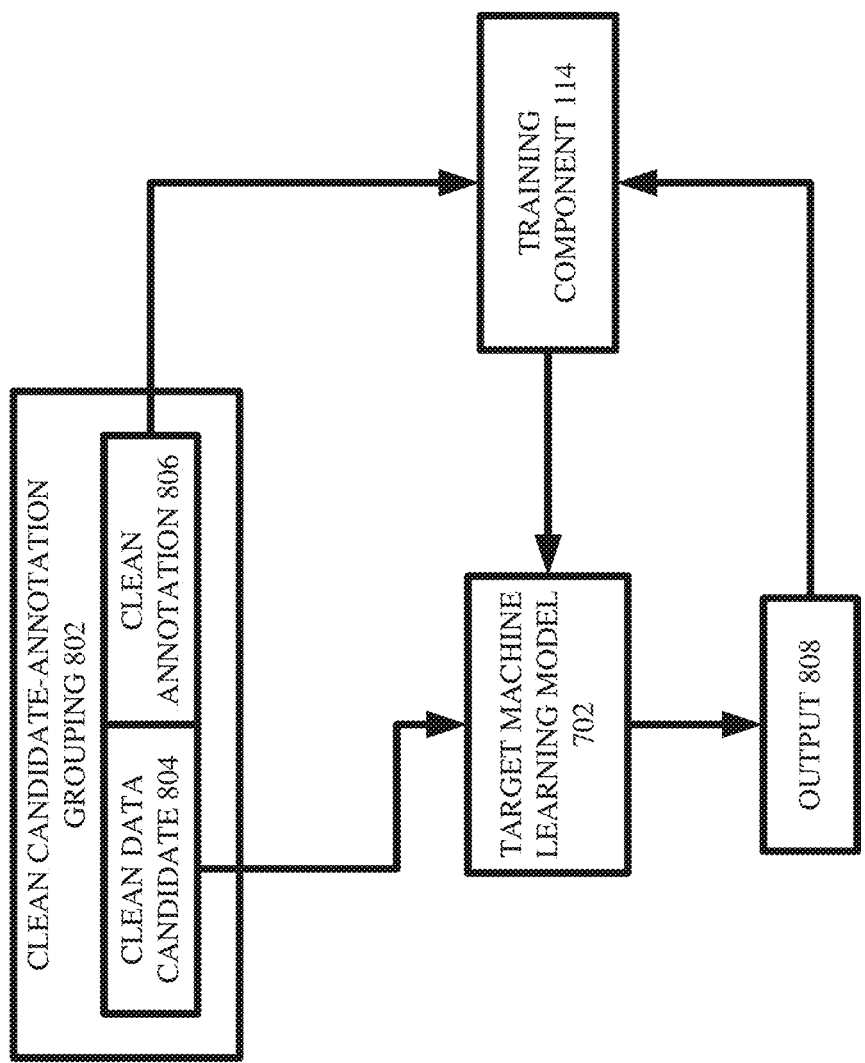
FIG. 8 illustrates a block diagram showing, in an example and non-limiting way, how a target machine learning model can be trained based on a clean dataset in accordance with one or more embodiments described herein.

FIG. 8 illustrates a block diagram 800 showing, in an example and non-limiting way, how the target machine learning model 702 can be trained based on the clean dataset 304 in accordance with one or more embodiments described herein.

In various aspects, the internal parameters (e.g., weights, biases) of the target machine learning model 702 can be randomly initialized. In various instances, there can be a clean candidate-annotation grouping 802 from the clean dataset 304. As shown, the clean candidate-annotation grouping 802 can comprise a clean data candidate 804 and/or a clean annotation 806. In various instances, the training component 114 can electronically feed the clean data candidate 804 to the target machine learning model 702. This can cause the target machine learning model 702 to generate an output 808 based on the clean data candidate 804. As those having ordinary skill in the art will appreciate, the output 808 can be considered as the result obtained by the target machine learning model 702 by performing the target task on the clean data candidate 804, whereas the clean annotation 806 can be considered as the correct, accurate, and/or ground-truth result that should have been obtained by the target machine learning model 702 if it accurately performed the target task on the clean data candidate 804. Accordingly, in various cases, the training component 114 can electronically compute an error and/or loss between the output 808 and the clean annotation 806 (e.g., such error/loss can indicate how incorrect and/or inaccurate the output 808 is). In various aspects, the training component 114 can electronically update, via backpropagation, the internal parameters of target machine learning model 702 based on the computed error and/or loss. In various cases, the training component 114 can repeat this procedure for each clean candidate-annotation grouping that is in the clean dataset 304, which can ultimately cause the internal parameters of the target machine learning model 702 to become iteratively optimized (e.g., such that the target machine learning model 702 can accurately perform the target task on data candidates). As those having ordinary skill in the art will understand, the training component 114 can implement any suitable batch sizes and/or any suitable number of training epochs.

Figure 9:
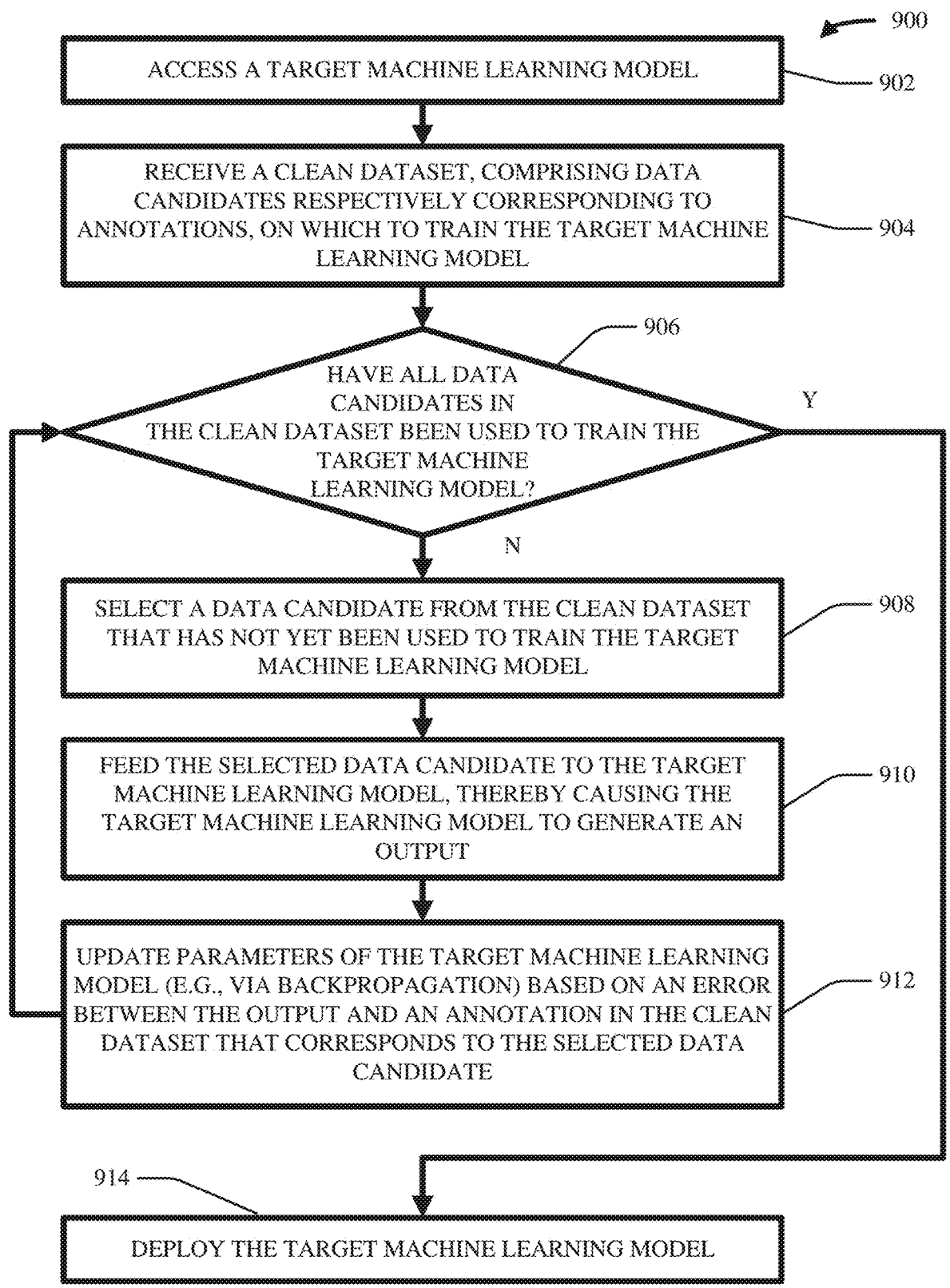
FIG. 9 illustrates a flow diagram of an example, non-limiting computer-implemented method that facilitates training of a target machine learning model based on a clean dataset in accordance with one or more embodiments described herein.

FIG. 9 illustrates a flow diagram of an example, non-limiting computer-implemented method 900 that can facilitate training of a target machine learning model based on a clean dataset in accordance with one or more embodiments described herein. In other words, the computer-implemented method 900 can show how the training component 114 can train the target machine learning model 702 on the clean dataset 304.

In various embodiments, act 902 can include accessing, by a device (e.g., 114) operatively coupled to a processor, a target machine learning model (e.g., 702).

In various aspects, act 904 can include receiving, by the device (e.g., 114), a clean dataset (e.g., 304), which can comprise data candidates respectively corresponding to annotations. In various cases, it can be desired to train the target machine learning model on the clean dataset.

In various instances, act 906 can include determining, by the device (e.g., 114), whether all data candidates in the clean dataset have been used to train the target machine learning model. If so, the computer-implemented method 900 can proceed to act 914. If not, the computer-implemented method 900 can proceed to act 908.

In various cases, act 908 can include selecting, by the device (e.g., 114), a data candidate (e.g., 804) from the clean dataset that has not yet been used to train the target machine learning model.

In various aspects, act 910 can include feeding, by the device (e.g., 114), the selected data candidate to the target machine learning model, which can cause the target machine learning model to generate an output (e.g., 808).

In various instances, act 912 can include updating, by the device (e.g., 114), parameters of the target machine learning model (e.g., via backpropagation) based on an error between the output and an annotation (e.g., 806) in the clean dataset that corresponds to the selected data candidate. In various cases, the computer-implemented method 900 can proceed back to act 906.

In various aspects, act 914 can include deploying, by the device (e.g., 114), the target machine learning model.

As shown, acts 906-912 can iterate until all data candidates in the clean dataset have been used to train the target machine learning model. In other cases, any other suitable training termination criterion can be used as desired (e.g., threshold number of training epochs reached, threshold error/loss reached).

The computer-implemented method 900 is a mere non-limiting example. Those having ordinary skill in the art will appreciate that any suitable batch sizes and/or any suitable numbers of training epochs can be implemented as desired.

As those having ordinary skill in the art will appreciate, FIGS. 7-9 can be considered as illustrating how the target machine learning model 702 can operate during training (e.g., as opposed to inferencing).

Figure 10:
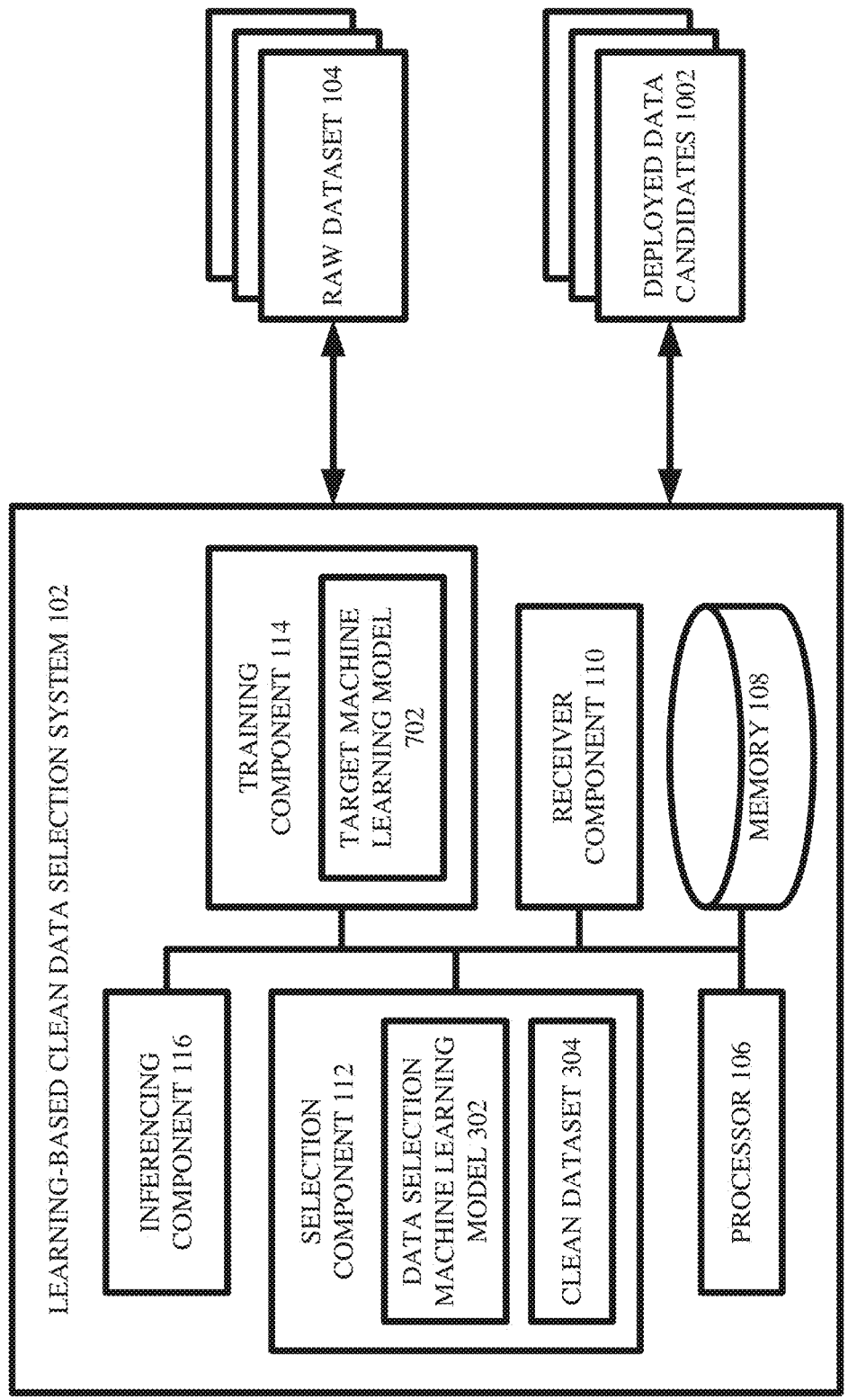
FIG. 10 illustrates a block diagram of an example, non-limiting system including a set of deployed data candidates that facilitates learning-based clean data selection in accordance with one or more embodiments described herein.

FIG. 10 illustrates a block diagram of an example, non-limiting system 1000 including a set of deployed data candidates that can facilitate learning-based clean data selection in accordance with one or more embodiments described herein. As shown, the system 1000 can, in some cases, comprise the same components as the system 700, and can further comprise a set of deployed data candidates 1002.

In various embodiments, the receiver component 110 can electronically receive, retrieve, and/or otherwise access the set of deployed data candidates 1002 from any suitable data structure and/or computing device (not shown). In various aspects, the set of deployed data candidates 1002 can comprise any suitable number of deployed data candidates, where a deployed data candidate can be a data candidate that is encountered in a commercial, industrial, operational, and/or otherwise non-training setting. In other words, a deployed data candidate can be a data candidate on which it is desired to perform the target task, and for which no correct, accurate, and/or ground-truth annotation is known. In various cases, the inferencing component 116 can electronically execute the target machine learning model 702, after training, on each of the set of deployed data candidates 1002. This is further discussed with respect to FIG. 11.

Figure 11:
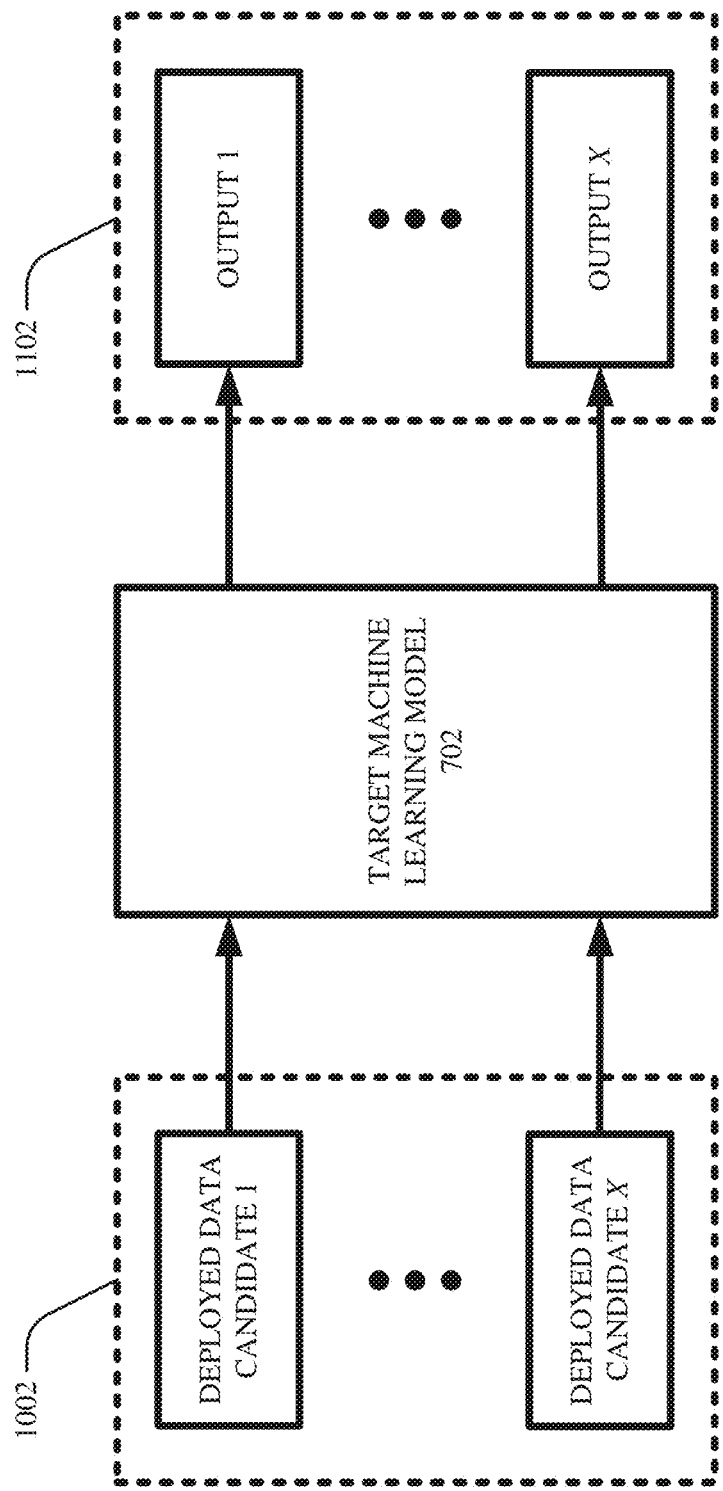
FIG. 11 illustrates a block diagram showing, in an example and non-limiting way, how a target machine learning model can be executed on a set of deployed data candidates in accordance with one or more embodiments described herein.

FIG. 11 illustrates a block diagram 1100 showing, in an example and non-limiting way, how the target machine learning model 702 can be executed on the set of deployed data candidates 1002 in accordance with one or more embodiments described herein.

As shown, in various cases, the set of deployed data candidates 1002 can comprise x deployed data candidates, for any suitable positive integer x. That is, the set of deployed data candidates 1002 can include a deployed data candidate 1 to a deployed data candidate x. In various aspects, the inferencing component 116 can electronically execute the target machine learning model 702 on each deployed data candidate in the set of deployed data candidates 1002, thereby yielding a set of outputs 1102. More specifically, in various aspects, the inferencing component 116 can electronically feed the deployed data candidate 1 to the target machine learning model 702. This can cause the target machine learning model 702 to generate an output 1, which can be based on and/or otherwise correspond to the deployed data candidate 1. In various cases, the output 1 can be considered as the result of performing the target task on the deployed data candidate 1 (e.g., if the target task is classification, the output 1 can be a classification label corresponding to the deployed data candidate 1; if the target task is segmentation, the output 1 can be a segmentation mask corresponding to the deployed data candidate 1). In similar fashion, the inferencing component 116 can electronically feed the deployed data candidate x to the target machine learning model 702. This can cause the target machine learning model 702 to generate an output x, which can be based on and/or otherwise correspond to the deployed data candidate x. In various cases, the output x can be considered as the result of performing the target task on the deployed data candidate x (e.g., if the target task is classification, the output x can be a classification label corresponding to the deployed data candidate x; if the target task is segmentation, the output x can be a segmentation mask corresponding to the deployed data candidate x).

In this way, the inferencing component 116 can electronically execute the target machine learning model 702 in a deployment, commercial, industrial, operational, and/or otherwise non-training setting, after the target machine learning model 702 has been trained by the training component 114.

Those having ordinary skill in the art will appreciate that, in some cases, the target machine learning model 702 can be configured to operate on one deployed data candidate at a time (e.g., can be configured to receive as input one deployed data candidate and to produce one output at a given time). Those having ordinary skill in the art will further appreciate that, in other cases, the target machine learning model 702 can be configured to operate on multiple deployed data candidates at a time (e.g., can be configured to receive as input more than one deployed data candidate and to produce more than one output at any given time).

As those having ordinary skill in the art will appreciate, FIGS. 10-11 can be considered as illustrating how the target machine learning model 702 can operate during inferencing (e.g., after the target machine learning model 702 has already been trained).

Figure 12:
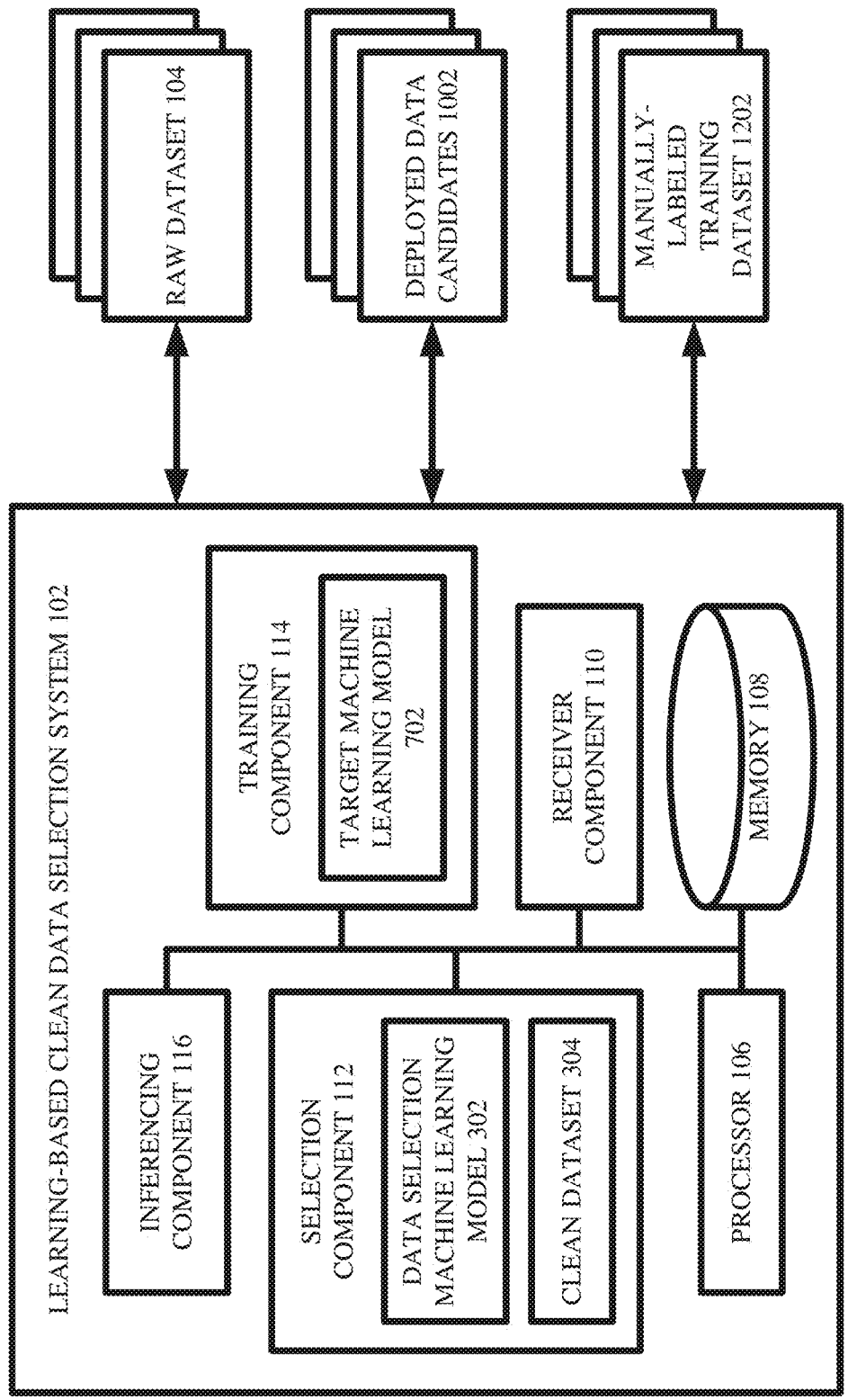
FIG. 12 illustrates a block diagram of an example, non-limiting system including a manually-labeled training dataset that facilitates learning-based clean data selection in accordance with one or more embodiments described herein.

FIG. 12 illustrates a block diagram of an example, non-limiting system 1200 including a manually-labeled training dataset that can facilitate learning-based clean data selection in accordance with one or more embodiments described herein. As shown, the system 1200 can, in some cases, comprise the same components as the system 1000, and can further comprise a manually-labeled training dataset 1202.

In various embodiments, as mentioned above, the data selection machine learning model 302 can itself require training in order to be able to accurately distinguish clean candidate-annotation groupings from unclean candidate-annotation groupings. In various aspects, the manually-labeled training dataset 1202 can be used to train the data selection machine learning model 302. More specifically, in various cases, the receiver component 110 can electronically receive, retrieve, and/or otherwise access the manually-labeled training dataset 1202 from any suitable database and/or computing device (not shown), whether centralized and/or decentralized, and/or whether remote from and/or local to the receiver component 110. In various instances, the manually-labeled training dataset 1202 can comprise any suitable number of training candidate-annotation groupings, where each training candidate-annotation grouping can respectively correspond to a manually-selected clean/unclean label that indicates whether the training candidate-annotation grouping is clean or unclean. Accordingly, in various aspects, the training component 114 can electronically train, in a supervised fashion, the data selection machine learning model 302 on the manually-labeled training dataset 1202, such that the data selection machine learning model 302 learns how to accurately classify clean-vs.-unclean candidate-annotation groupings. This is further described with respect to FIGS. 13-14.

Figure 13:
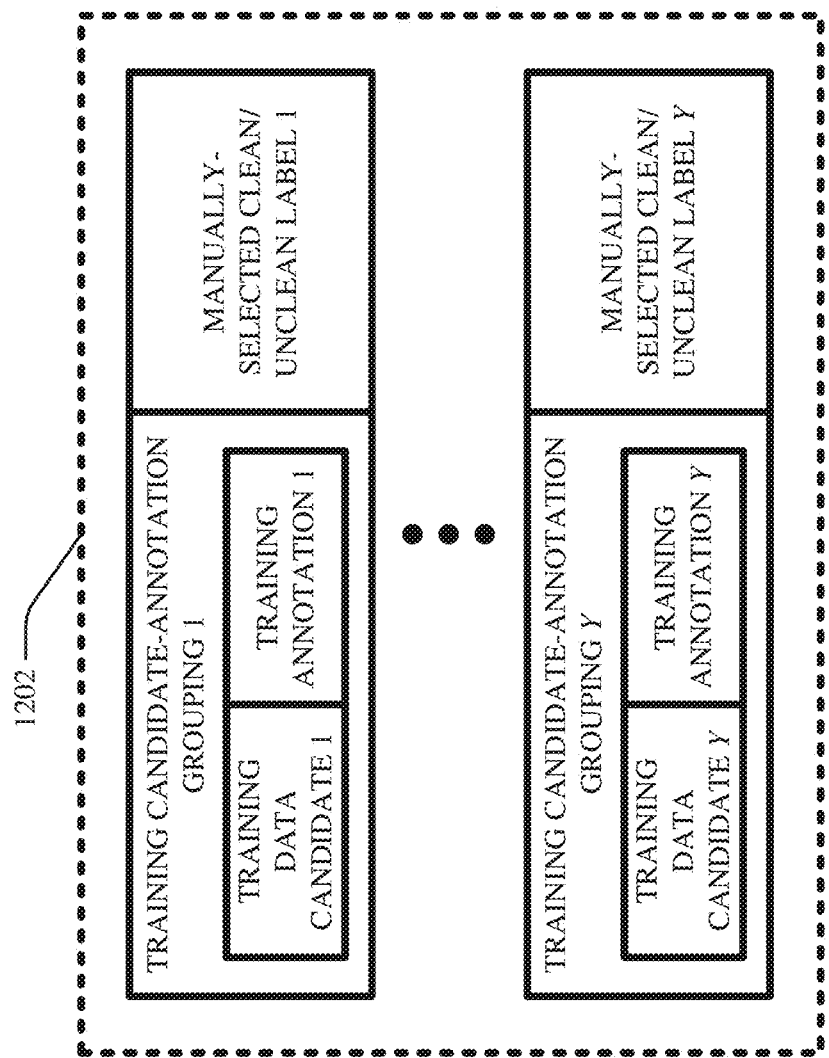
FIG. 13 illustrates a block diagram of an example, non-limiting manually-labeled training dataset that facilitates learning-based clean data selection in accordance with one or more embodiments described herein.

FIG. 13 illustrates a block diagram 1300 of an example, non-limiting manually-labeled training dataset that can facilitate learning-based clean data selection in accordance with one or more embodiments described herein. In other words, FIG. 13 illustrates an example and non-limiting embodiment of the manually-labeled training dataset 1202.

As shown, the manually-labeled training dataset 1202 can, in various aspects, comprise y training candidate-annotation groupings, for any suitable positive integer y. That is, the manually-labeled training dataset 1202 can comprise a training candidate-annotation grouping 1 to a training candidate-annotation grouping y. In various cases, the training candidate-annotation grouping 1 can include a training data candidate 1 and a training annotation 1, and the training candidate-annotation grouping y can include a training data candidate y and a training annotation y. In various instances, as shown, each training candidate-annotation grouping in the manually-labeled training dataset 1202 can respectively correspond to a manually-selected clean/unclean label. More specifically, the training candidate-annotation grouping 1 can respectively correspond to a manually-selected clean/unclean label 1, and the training candidate-annotation grouping y can respectively correspond to a manually-selected clean/unclean label y. In various instances, the manually-selected clean/unclean label 1 can be a classification label that is established by a subject matter expert (e.g., operator, clinician, engineer) and that indicates whether the training candidate-annotation grouping 1 is clean (e.g., is suitable to be used to train a model to perform the target task) or unclean (e.g., is not suitable to be used to train a model to perform the target task). Similarly, the manually-selected clean/unclean label y can be a classification label that is established by a subject matter expert (e.g., operator, clinician, engineer) and that indicates whether the training candidate-annotation grouping y is clean (e.g., is suitable to be used to train a model to perform the target task) or unclean (e.g., is not suitable to be used to train a model to perform the target task). In various cases, these manually-selected clean/unclean labels can be leveraged to train the data selection machine learning model 302.

Figure 14:
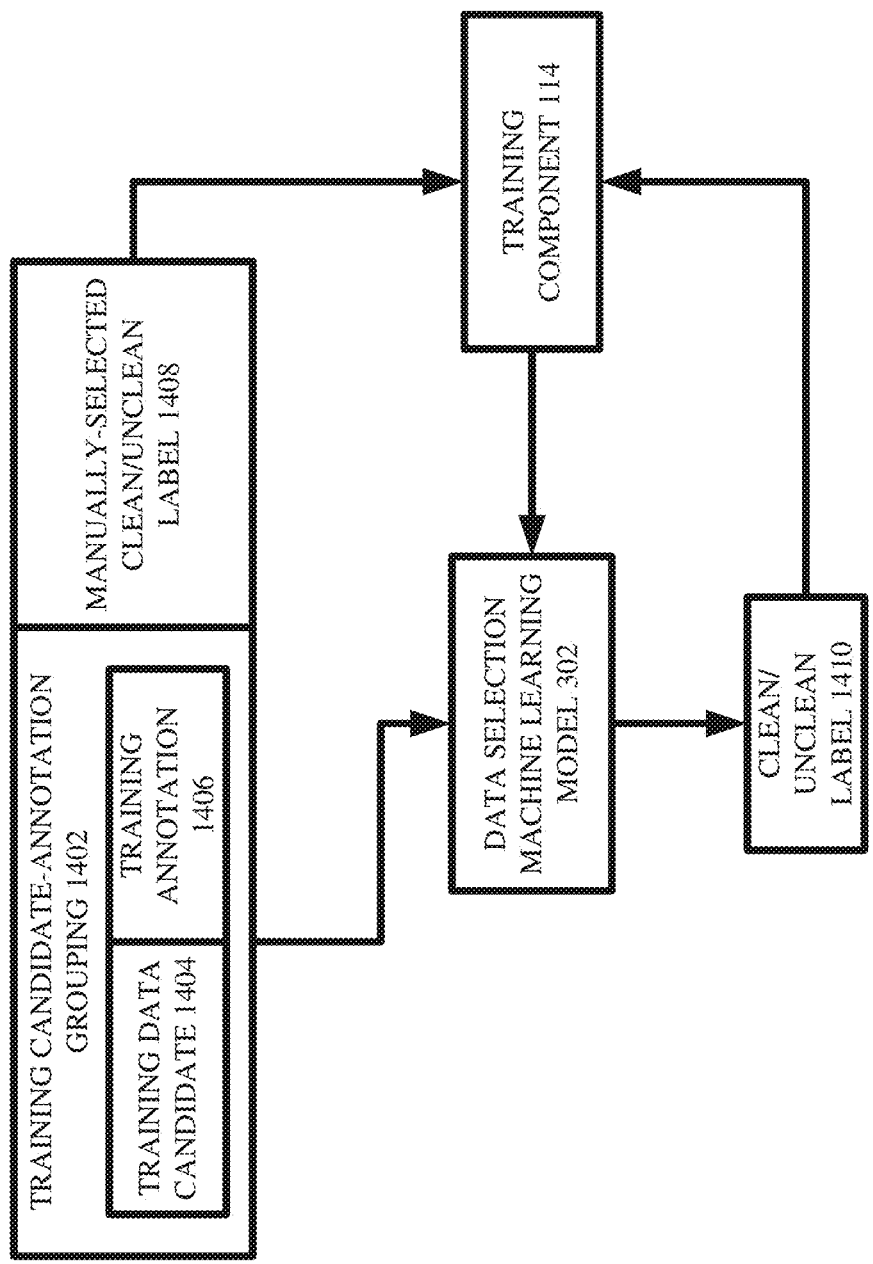
FIG. 14 illustrates a block diagram showing, in an example and non-limiting way, how a data selection machine learning model can be trained on a manually-labeled training dataset in accordance with one or more embodiments described herein.

FIG. 14 illustrates a block diagram 1400 showing, in an example and non-limiting way, how the data selection machine learning model 302 can be trained on the manually-labeled training dataset 1202 in accordance with one or more embodiments described herein.

In various aspects, the internal parameters (e.g., weights, biases) of the data selection machine learning model 302 can be randomly initialized. In various instances, there can be a training candidate-annotation grouping 1402 from the manually-labeled training dataset 1202. As shown, the training candidate-annotation grouping 1402 can comprise a training data candidate 1404 that is concatenated, linked to, and/or otherwise associated with a training annotation 1406. Moreover, as shown, the training candidate-annotation grouping 1402 can respectively correspond to a manually-selected clean/unclean label 1408. In various aspects, the training component 114 can electronically feed the training candidate-annotation grouping 1402 (e.g., can electronically feed both the training data candidate 1404 and the training annotation 1406) to the data selection machine learning model 302. This can cause the data selection machine learning model 302 to generate a clean/unclean label 1410 based on the training candidate-annotation grouping 1402. As those having ordinary skill in the art will appreciate, the clean/unclean label 1410 can be considered as the label (e.g., clean or unclean) that the data selection machine learning model 302 concludes that the training candidate-annotation grouping 1402 should have, whereas the manually-selected clean/unclean label 1408 can be considered as the correct, accurate, and/or ground-truth label (e.g., clean or unclean) that the training candidate-annotation grouping 1402 actually does have. Accordingly, in various cases, the training component 114 can electronically compute an error and/or loss between the clean/unclean label 1410 and the manually-selected clean/unclean label 1408 (e.g., such error/loss can indicate how incorrect and/or inaccurate the clean/unclean label 1410 is). In various aspects, the training component 114 can electronically update, via backpropagation, the internal parameters of data selection machine learning model 302 based on the computed error and/or loss. In various cases, the training component 114 can repeat this procedure for each training candidate-annotation grouping that is in the manually-labeled training dataset 1202, which can ultimately cause the internal parameters of the data selection machine learning model 302 to become iteratively optimized (e.g., such that the data selection machine learning model 302 can accurately label candidate-annotation groupings as either clean or unclean). As those having ordinary skill in the art will understand, the training component 114 can implement any suitable batch sizes and/or any suitable number of training epochs.

Figure 15:
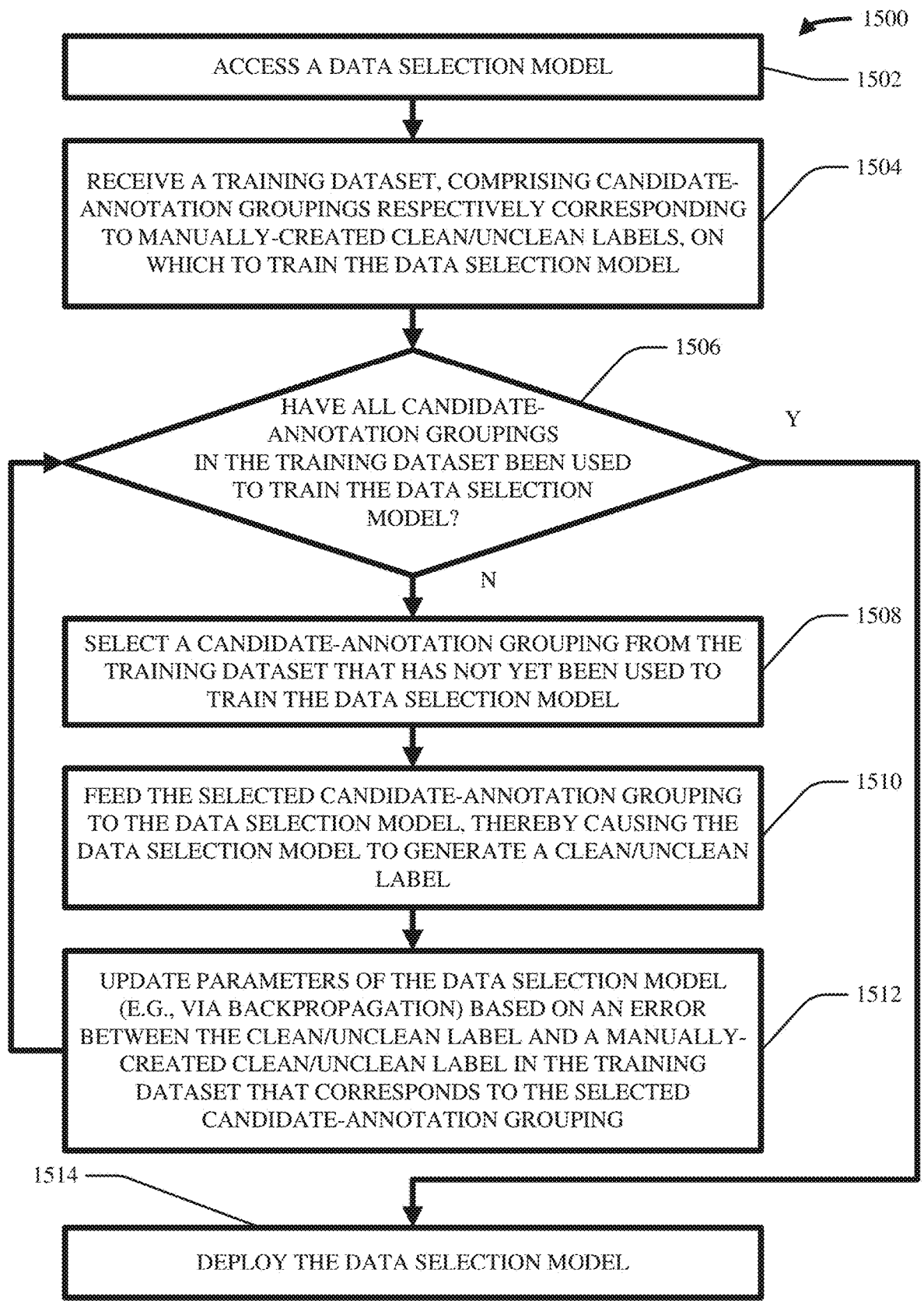
FIG. 15 illustrates a flow diagram of an example, non-limiting computer-implemented method that facilitates training of a data selection machine learning model in accordance with one or more embodiments described herein.

FIG. 15 illustrates a flow diagram of an example, non-limiting computer-implemented method 1500 that can facilitate training of a data selection machine learning model in accordance with one or more embodiments described herein. In other words, the computer-implemented method 1500 can show how the training component 114 can train the data selection machine learning model 302 on the manually-labeled training dataset 1202.

In various embodiments, act 1502 can include accessing, by a device (e.g., 114) operatively coupled to a processor, a data selection model (e.g., 302).

In various aspects, act 1504 can include receiving, by the device (e.g., 114 and/or 110), a training dataset (e.g., 1202), which can comprise candidate-annotation groupings respectively corresponding to manually-created clean/unclean labels. In various cases, it can be desired to train the data selection model on the training dataset.

In various instances, act 1506 can include determining, by the device (e.g., 114), whether all candidate-annotation groupings in the training dataset have been used to train the data selection model. If so, the computer-implemented method 1500 can proceed to act 1514. If not, the computer-implemented method 1500 can proceed to act 1508.

In various cases, act 1508 can include selecting, by the device (e.g., 114), a candidate-annotation grouping (e.g., 1402) from the training dataset that has not yet been used to train the data selection model.

In various aspects, act 1510 can include feeding, by the device (e.g., 114), the selected candidate-annotation grouping to the data selection model, which can cause the data selection model to generate a clean/unclean label (e.g., 1410).

In various instances, act 1512 can include updating, by the device (e.g., 114), parameters of the data selection model (e.g., via backpropagation) based on an error between the clean/unclean label and a manually-created clean/unclean label (e.g., 1408) in the training dataset that corresponds to the selected candidate-annotation grouping. In various cases, the computer-implemented method 1500 can proceed back to act 1506.

In various aspects, act 1514 can include deploying, by the device (e.g., 114), the data selection model.

As shown, acts 1506-1512 can iterate until all candidate-annotation groupings in the training dataset have been used to train the data selection model. In other cases, any other suitable training termination criterion can be used as desired (e.g., threshold number of training epochs reached, threshold error/loss reached).

The computer-implemented method 1500 is a mere non-limiting example. Those having ordinary skill in the art will appreciate that any suitable batch sizes and/or any suitable numbers of training epochs can be implemented as desired.

As described herein, those having ordinary skill in the art will appreciate that the data selection machine learning model 302 and the target machine learning model 702 can be configured to receive different inputs and to produce different outputs. Specifically, the target machine learning model 702 can be configured to receive as input a data candidate and to produce an output that represents the result obtained when the target task is performed on the data candidate. In contrast, the data selection machine learning model 302 can be configured to receive as input a candidate-annotation grouping (e.g., a data candidate concatenated with a corresponding annotation) and to produce as output a label that indicates whether the candidate-annotation grouping is clean (e.g., suitable to be used to train the target machine learning model to perform the target task) or unclean (e.g., unsuitable to be used to train the target machine learning model to perform the target task).

As those having ordinary skill in the art will appreciate, FIGS. 12-15 can be considered as illustrating how the data selection machine learning model 302 can operate during training (e.g., as opposed to inferencing).

Figure 16:
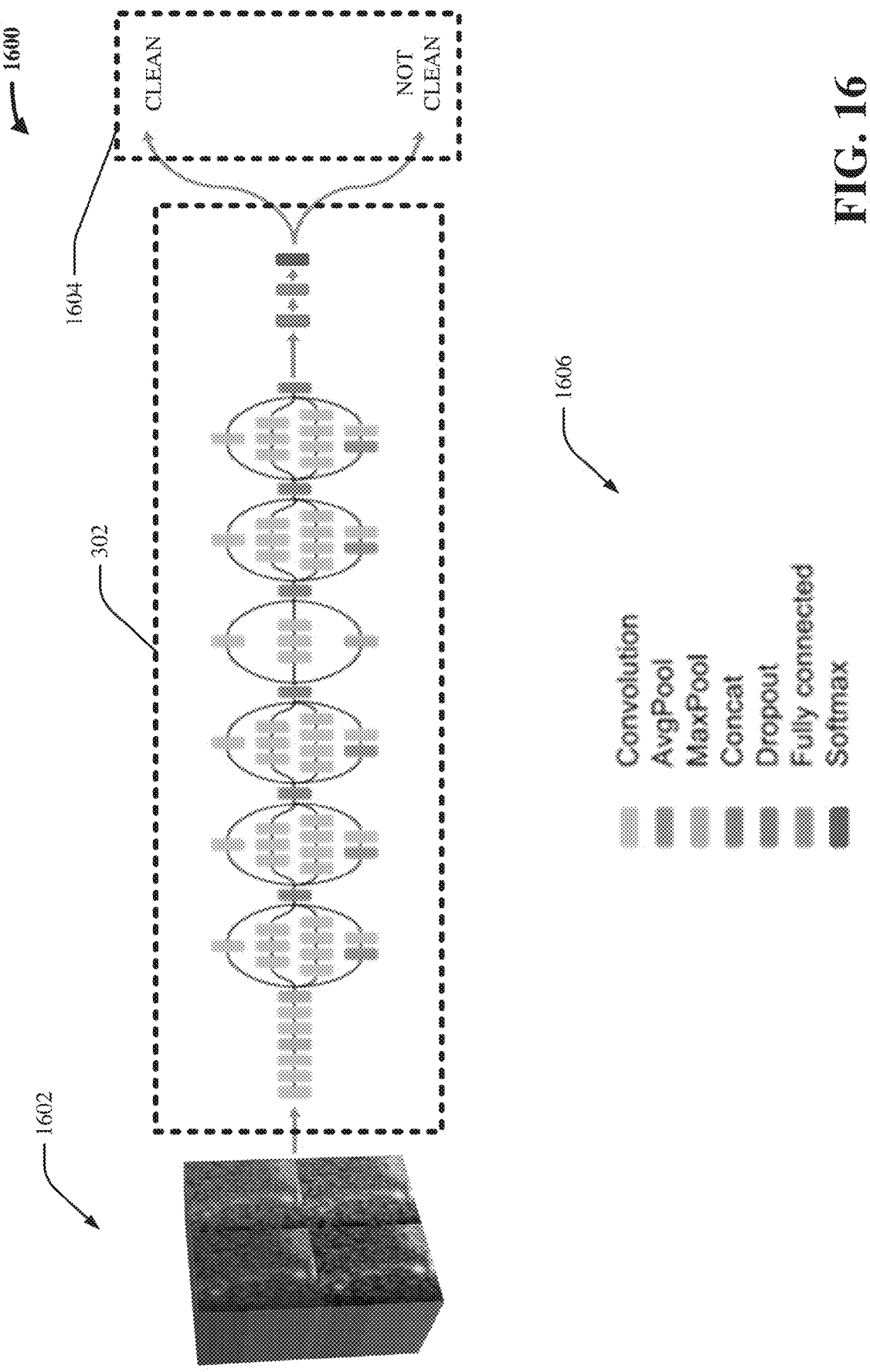
FIG. 16 illustrates a block diagram of an example, non-limiting data selection machine learning model that facilitates learning-based clean data selection in accordance with one or more embodiments described herein.

FIG. 16 illustrates a block diagram 1600 of an example, non-limiting data selection machine learning model that can facilitate learning-based clean data selection in accordance with one or more embodiments described herein. In other words, FIG. 16 shows a non-limiting example of the data selection machine learning model 302 that has been reduced to practice by the inventors of various embodiments described herein.

As shown, the data selection machine learning model 302 can be configured to receive as input a candidate-annotation grouping 1602 and to produce as output a clean/unclean label 1604. In this non-limiting embodiment, the target task is X-ray image quality improvement. Thus, as shown, the candidate-annotation grouping 1602 can be a low-quality X-ray image that is concatenated with a higher-quality version of the low-quality X-ray image.

More specifically, as can be seen in FIG. 16, an upper-left portion of the candidate-annotation grouping 1602 can be a low-quality and/or low-power X-ray image, a lower-left portion of the candidate-annotation grouping 1602 can be a normalized version of the low-quality and/or low-power X-ray image, an upper-right portion of the candidate-annotation grouping 1602 can be a high-quality and/or high-power version of the low-quality and/or low-power X-ray image, and a lower-right portion of the candidate-annotation grouping 1602 can be a normalized version of the higher-quality and/or higher-power X-ray image. In other words, the low-quality X-ray image and the normalized version of the low-quality X-ray image can collectively be considered as a data candidate, and the higher-power X-ray image and the normalized version of the higher-power X-ray image can collectively be considered as a ground-truth annotation corresponding to the data candidate. Those having ordinary skill in the art will appreciate that the structure of the candidate-annotation grouping 1602 shown in FIG. 16 is a mere non-limiting example of how a candidate-annotation grouping can be structured. In various aspects, as shown, the data selection machine learning model 302 can have a deep learning neural network architecture, the structure of which is given by a legend 1606.

In various cases, the inventors trained the depicted embodiment of the data selection machine learning model 302 using a batch size of 72, a cross entropy loss function, and a learning rate of 0.0001 with cosine decay and a cycle length of 30 epochs. After such training, the inventors tested the depicted embodiment of the data selection machine learning model 302, which exhibited a test accuracy of 81.35%, a sensitivity of 0.88, a specificity of 0.72, and an area-under-curve of 87.01%. Once trained, the inventors utilized the depicted embodiment of the data selection machine learning model 302 to generate a non-limiting embodiment of the clean dataset 304, and the inventors then used the clean dataset 304 to train a first non-limiting embodiment of the target machine learning model 702 to perform X-ray image quality improvement. Once the first non-limiting embodiment of the target machine learning model 702 was trained, the inventors tested it. Additionally, for purposes of comparison, the inventors trained a second non-limiting embodiment of the target machine learning model 702 by using existing rule-based filtration techniques. Some example results of such testing are discussed with respect to FIGS. 17-22.

Figure 17:
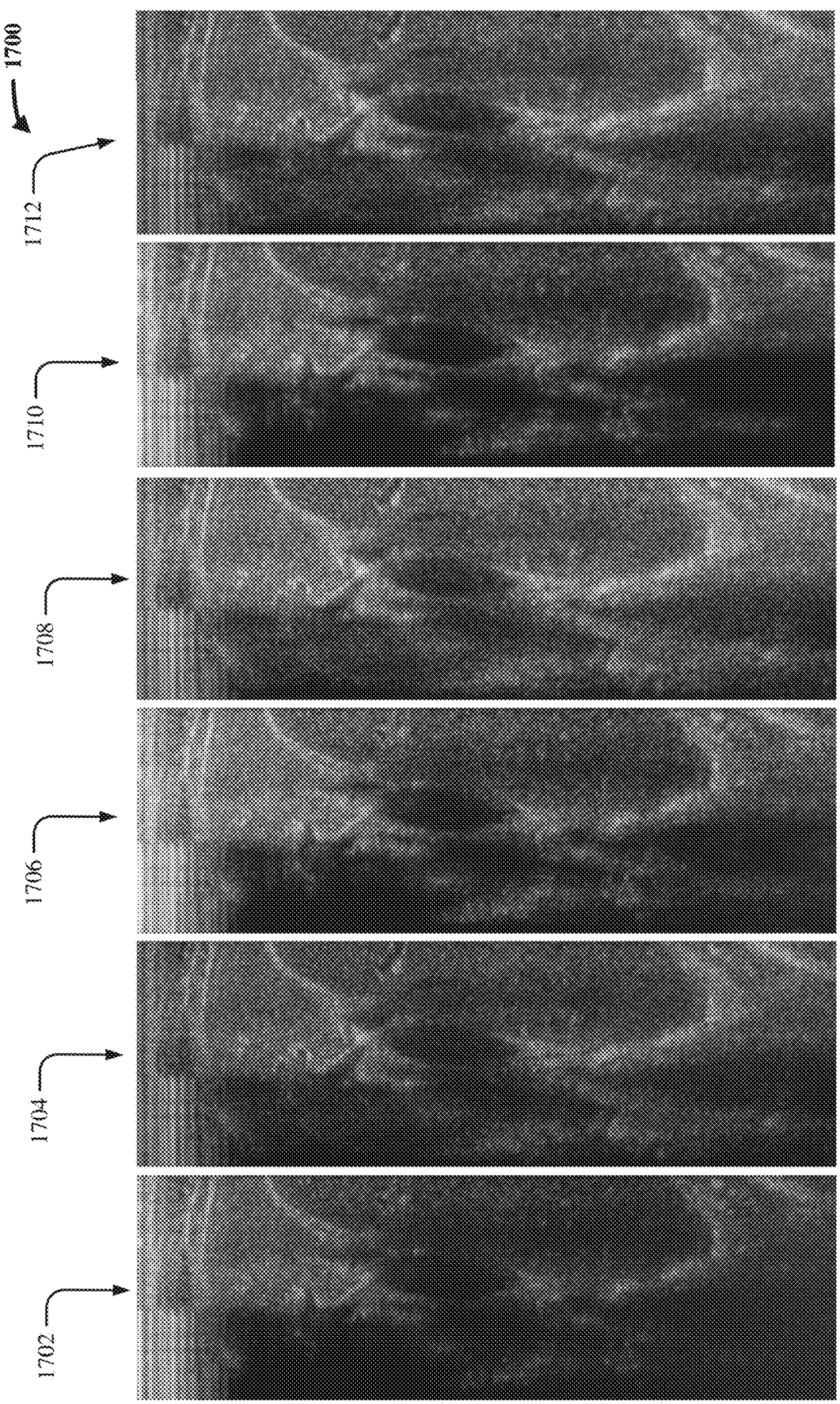
FIGS. 17-22 illustrate example, non-limiting results obtained from a target machine learning model in accordance with one or more embodiments described herein.

First consider FIG. 17. FIG. 17 illustrates six X-ray images: 1702-1712. In various cases, the X-ray image 1702 is a low-quality X-ray image of an anatomical structure that was generated by an X-ray scanner using a low power setting. In contrast, the X-ray image 1704 is a high-power X-ray image depicting the same anatomical structure that was generated by the same X-ray scanner using a high power setting. Once fully trained, the second non-limiting embodiment of the target machine learning model 702 (e.g., which was trained via existing rule-based filtration) was executed on the X-ray image 1702, resulting in the X-ray image 1706. Additionally, once fully trained, the second non-limiting embodiment of the target machine learning model 702 (e.g., which was trained via existing rule-based filtration) was also executed on the X-ray image 1704, resulting in the X-ray image 1708. Similarly, once fully trained, the first non-limiting embodiment of the data selection machine learning model 302 (e.g., which was trained via learning-based clean data selection as described herein) was executed on the X-ray image 1702, resulting in the X-ray image 1710. Furthermore, once fully trained, the first non-limiting embodiment of the data selection machine learning model 302 (e.g., which was trained via learning-based clean data selection as described herein) was also executed on the X-ray image 1704, resulting in the X-ray image 1712.

As one having ordinary skill in the art is able to visually notice, the X-ray images 1706 and 1708 are respectively better (e.g., higher quality) than the X-ray images 1702 and 1704. However, as one having ordinary skill in the art is able to visually notice, the X-ray images 1710 and 1712 are respectively better (e.g., higher quality) than the X-ray images 1702 and 1704, and the X-ray images 1710 and 1712 are also respectively better (e.g., higher quality) than the X-ray images 1706 and 1708. In other words, when the clean dataset 304 is generated by the data selection machine learning model 302, the target machine learning model 702 can, once trained, exhibit noticeably better performance, as compared to a situation in which the clean dataset 304 is generated by an existing rule-based filtration technique. This helps to show that various embodiments described herein constitute concrete and tangible technical improvements in the field of clean data selection.

Figure 18:
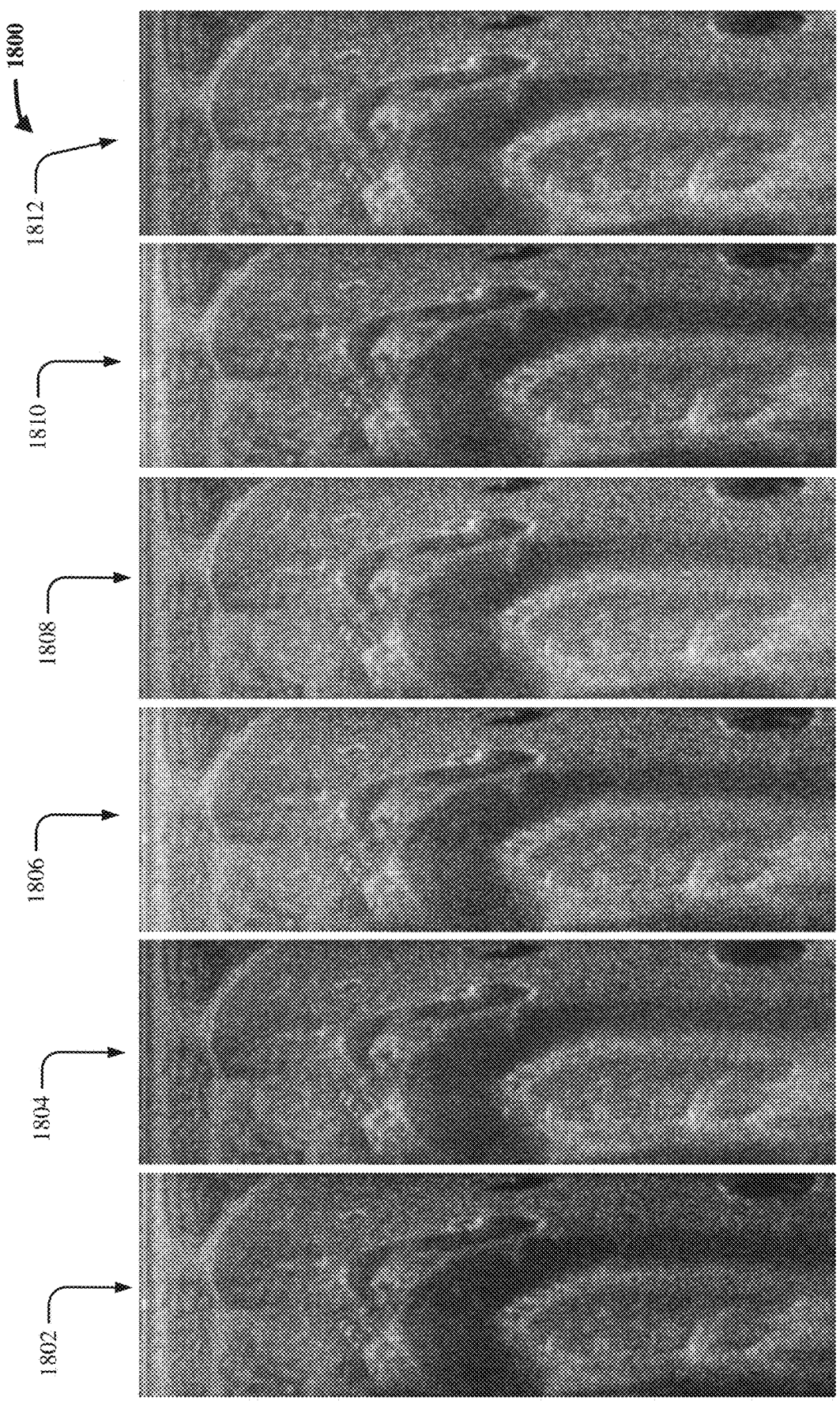

Now consider FIG. 18. FIG. 18 illustrates six X-ray images. Just as above, the X-ray image 1802 is a low-quality X-ray image of an anatomical structure that was generated by an X-ray scanner using a low power setting, and the X-ray image 1804 is a high-power X-ray image depicting the same anatomical structure that was generated by the same X-ray scanner using a high power setting. Additionally, the X-ray image 1806 is the result outputted by the second non-limiting embodiment of the target machine learning model 702 (e.g., trained via existing rule-based filtration) when analyzing the X-ray image 1802, and the X-ray image 1808 is the result outputted by the second non-limiting embodiment of the target machine learning model 702 (e.g., trained via existing rule-based filtration) when analyzing the X-ray image 1804. Moreover, the X-ray image 1810 is the result outputted by the first non-limiting embodiment of the target machine learning model 702 (e.g., trained via learning-based clean data selection) when analyzing the X-ray image 1802, and the X-ray image 1812 is the result outputted by the first non-limiting embodiment of the target machine learning model 702 (e.g., trained via learning-based clean data selection) when analyzing the X-ray image 1804.

As one having ordinary skill in the art is able to visually notice, the X-ray images 1806 and 1808 are respectively better (e.g., higher quality) than the X-ray images 1802 and 1804. However, as one having ordinary skill in the art is able to visually notice, the X-ray images 1810 and 1812 are respectively better (e.g., higher quality) than the X-ray images 1802 and 1804, and the X-ray images 1810 and 1812 are also respectively better (e.g., higher quality) than the X-ray images 1806 and 1808. Again, this means that, when the clean dataset 304 is generated by the data selection machine learning model 302, the target machine learning model 702 can, once trained, exhibit noticeably better performance, as compared to a situation in which the clean dataset 304 is generated by an existing rule-based filtration technique. This helps to show that various embodiments described herein constitute concrete and tangible technical improvements in the field of clean data selection.

Figure 19:
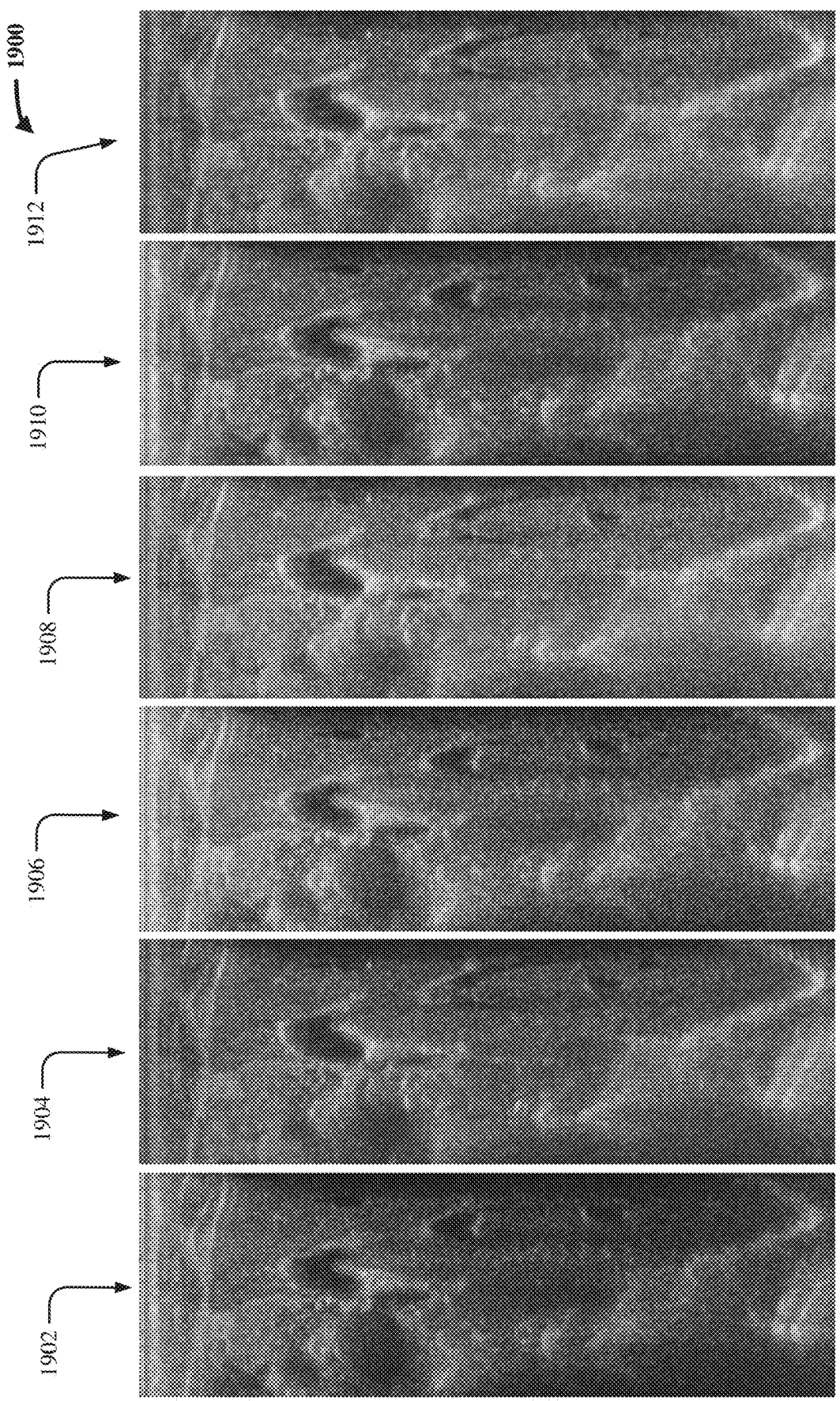

Now consider FIG. 19. FIG. 19 illustrates six X-ray images. Just as above, the X-ray image 1902 is a low-quality X-ray image of an anatomical structure that was generated by an X-ray scanner using a low power setting, and the X-ray image 1904 is a high-power X-ray image depicting the same anatomical structure that was generated by the same X-ray scanner using a high power setting. Additionally, the X-ray image 1906 is the result outputted by the second non-limiting embodiment of the target machine learning model 702 (e.g., trained via existing rule-based filtration) when analyzing the X-ray image 1902, and the X-ray image 1908 is the result outputted by the second non-limiting embodiment of the target machine learning model 702 (e.g., trained via existing rule-based filtration) when analyzing the X-ray image 1904. Moreover, the X-ray image 1910 is the result outputted by the first non-limiting embodiment of the target machine learning model 702 (e.g., trained via learning-based clean data selection) when analyzing the X-ray image 1902, and the X-ray image 1912 is the result outputted by the first non-limiting embodiment of the target machine learning model 702 (e.g., trained via learning-based clean data selection) when analyzing the X-ray image 1904.

As one having ordinary skill in the art is able to visually notice, the X-ray images 1906 and 1908 are respectively better (e.g., higher quality) than the X-ray images 1902 and 1904. However, as one having ordinary skill in the art is able to visually notice, the X-ray images 1910 and 1912 are respectively better (e.g., higher quality) than the X-ray images 1902 and 1904, and the X-ray images 1910 and 1912 are also respectively better (e.g., higher quality) than the X-ray images 1906 and 1908. Again, this means that, when the clean dataset 304 is generated by the data selection machine learning model 302, the target machine learning model 702 can, once trained, exhibit noticeably better performance, as compared to a situation in which the clean dataset 304 is generated by an existing rule-based filtration technique. This helps to show that various embodiments described herein constitute concrete and tangible technical improvements in the field of clean data selection.

Figure 20:
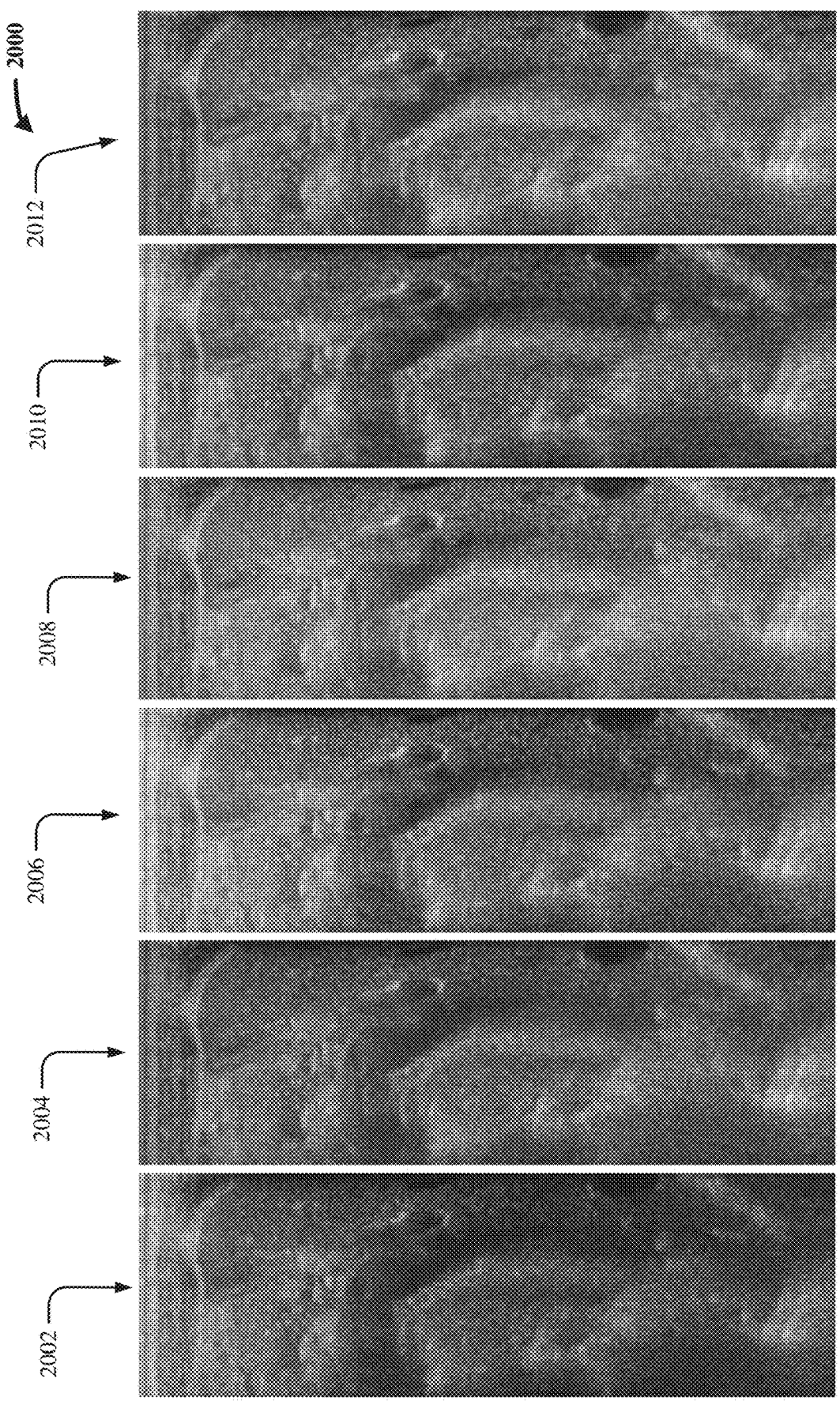

Now consider FIG. 20. FIG. 20 illustrates six X-ray images. Just as above, the X-ray image 2002 is a low-quality X-ray image of an anatomical structure that was generated by an X-ray scanner using a low power setting, and the X-ray image 2004 is a high-power X-ray image depicting the same anatomical structure that was generated by the same X-ray scanner using a high power setting. Additionally, the X-ray image 2006 is the result outputted by the second non-limiting embodiment of the target machine learning model 702 (e.g., trained via existing rule-based filtration) when analyzing the X-ray image 2002, and the X-ray image 2008 is the result outputted by the second non-limiting embodiment of the target machine learning model 702 (e.g., trained via existing rule-based filtration) when analyzing the X-ray image 2004. Moreover, the X-ray image 2010 is the result outputted by the first non-limiting embodiment of the target machine learning model 702 (e.g., trained via learning-based clean data selection) when analyzing the X-ray image 2002, and the X-ray image 2012 is the result outputted by the first non-limiting embodiment of the target machine learning model 702 (e.g., trained via learning-based clean data selection) when analyzing the X-ray image 2004.

As one having ordinary skill in the art is able to visually notice, the X-ray images 2006 and 2008 are respectively better (e.g., higher quality) than the X-ray images 2002 and 2004. However, as one having ordinary skill in the art is able to visually notice, the X-ray images 2010 and 2012 are respectively better (e.g., higher quality) than the X-ray images 2002 and 2004, and the X-ray images 2010 and 2012 are also respectively better (e.g., higher quality) than the X-ray images 2006 and 2008. Again, this means that, when the clean dataset 304 is generated by the data selection machine learning model 302, the target machine learning model 702 can, once trained, exhibit noticeably better performance, as compared to a situation in which the clean dataset 304 is generated by an existing rule-based filtration technique. This helps to show that various embodiments described herein constitute concrete and tangible technical improvements in the field of clean data selection.

Figure 21:
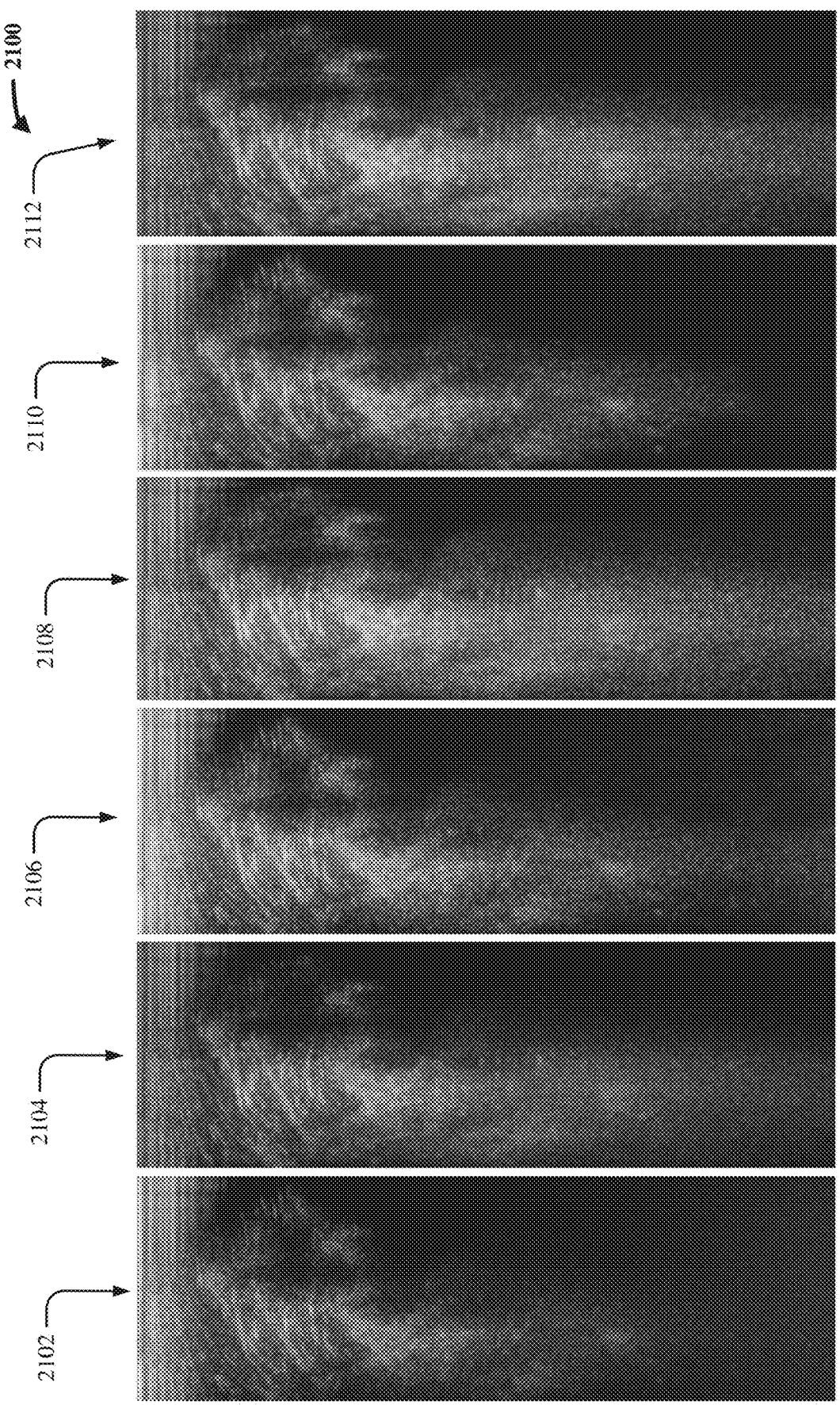

Now consider FIG. 21. FIG. 21 illustrates six X-ray images. Just as above, the X-ray image 2102 is a low-quality X-ray image of an anatomical structure that was generated by an X-ray scanner using a low power setting, and the X-ray image 2104 is a high-power X-ray image depicting the same anatomical structure that was generated by the same X-ray scanner using a high power setting. Additionally, the X-ray image 2106 is the result outputted by the second non-limiting embodiment of the target machine learning model 702 (e.g., trained via existing rule-based filtration) when analyzing the X-ray image 2102, and the X-ray image 2108 is the result outputted by the second non-limiting embodiment of the target machine learning model 702 (e.g., trained via existing rule-based filtration) when analyzing the X-ray image 2104. Moreover, the X-ray image 2110 is the result outputted by the first non-limiting embodiment of the target machine learning model 702 (e.g., trained via learning-based clean data selection) when analyzing the X-ray image 2102, and the X-ray image 2112 is the result outputted by the first non-limiting embodiment of the target machine learning model 702 (e.g., trained via learning-based clean data selection) when analyzing the X-ray image 2104.

As one having ordinary skill in the art is able to visually notice, the X-ray images 2106 and 2108 are respectively better (e.g., higher quality) than the X-ray images 2102 and 2104. However, as one having ordinary skill in the art is able to visually notice, the X-ray images 2110 and 2112 are respectively better (e.g., higher quality) than the X-ray images 2102 and 2104, and the X-ray images 2110 and 2112 are also respectively better (e.g., higher quality) than the X-ray images 2106 and 2108. Again, this means that, when the clean dataset 304 is generated by the data selection machine learning model 302, the target machine learning model 702 can, once trained, exhibit noticeably better performance, as compared to a situation in which the clean dataset 304 is generated by an existing rule-based filtration technique. This helps to show that various embodiments described herein constitute concrete and tangible technical improvements in the field of clean data selection.

Figure 22:
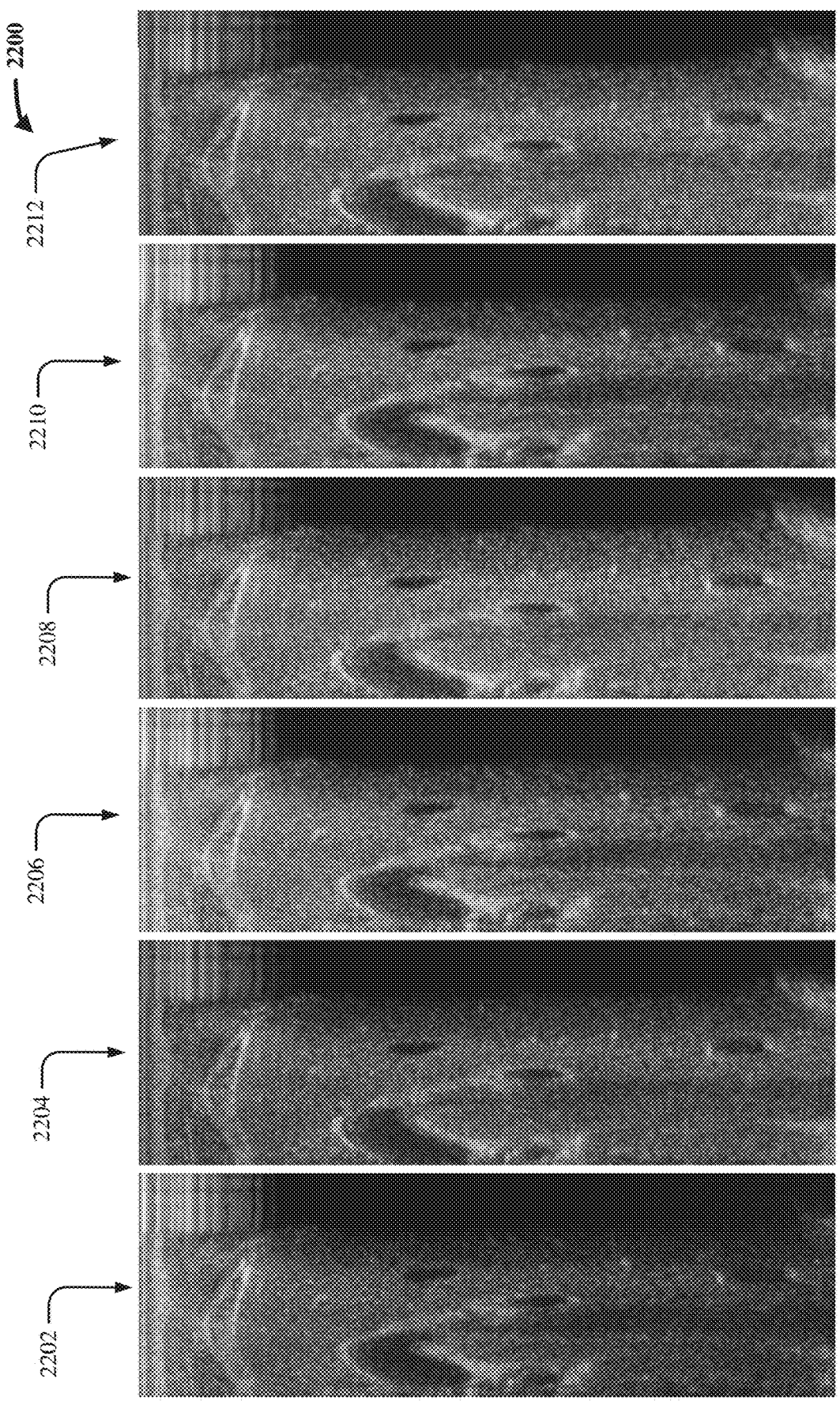

Finally consider FIG. 22. FIG. 22 illustrates six X-ray images. Just as above, the X-ray image 2202 is a low-quality X-ray image of an anatomical structure that was generated by an X-ray scanner using a low power setting, and the X-ray image 2204 is a high-power X-ray image depicting the same anatomical structure that was generated by the same X-ray scanner using a high power setting. Additionally, the X-ray image 2206 is the result outputted by the second non-limiting embodiment of the target machine learning model 702 (e.g., trained via existing rule-based filtration) when analyzing the X-ray image 2202, and the X-ray image 2208 is the result outputted by the second non-limiting embodiment of the target machine learning model 702 (e.g., trained via existing rule-based filtration) when analyzing the X-ray image 2204. Moreover, the X-ray image 2210 is the result outputted by the first non-limiting embodiment of the target machine learning model 702 (e.g., trained via learning-based clean data selection) when analyzing the X-ray image 2202, and the X-ray image 2212 is the result outputted by the first non-limiting embodiment of the target machine learning model 702 (e.g., trained via learning-based clean data selection) when analyzing the X-ray image 2204.

As one having ordinary skill in the art is able to visually notice, the X-ray images 2206 and 2208 are respectively better (e.g., higher quality) than the X-ray images 2202 and 2204. However, as one having ordinary skill in the art is able to visually notice, the X-ray images 2210 and 2212 are respectively better (e.g., higher quality) than the X-ray images 2202 and 2204, and the X-ray images 2210 and 2212 are also respectively better (e.g., higher quality) than the X-ray images 2206 and 2208. Again, this means that, when the clean dataset 304 is generated by the data selection machine learning model 302, the target machine learning model 702 can, once trained, exhibit noticeably better performance, as compared to a situation in which the clean dataset 304 is generated by an existing rule-based filtration technique. This helps to show that various embodiments described herein constitute concrete and tangible technical improvements in the field of clean data selection.

Figure 23:
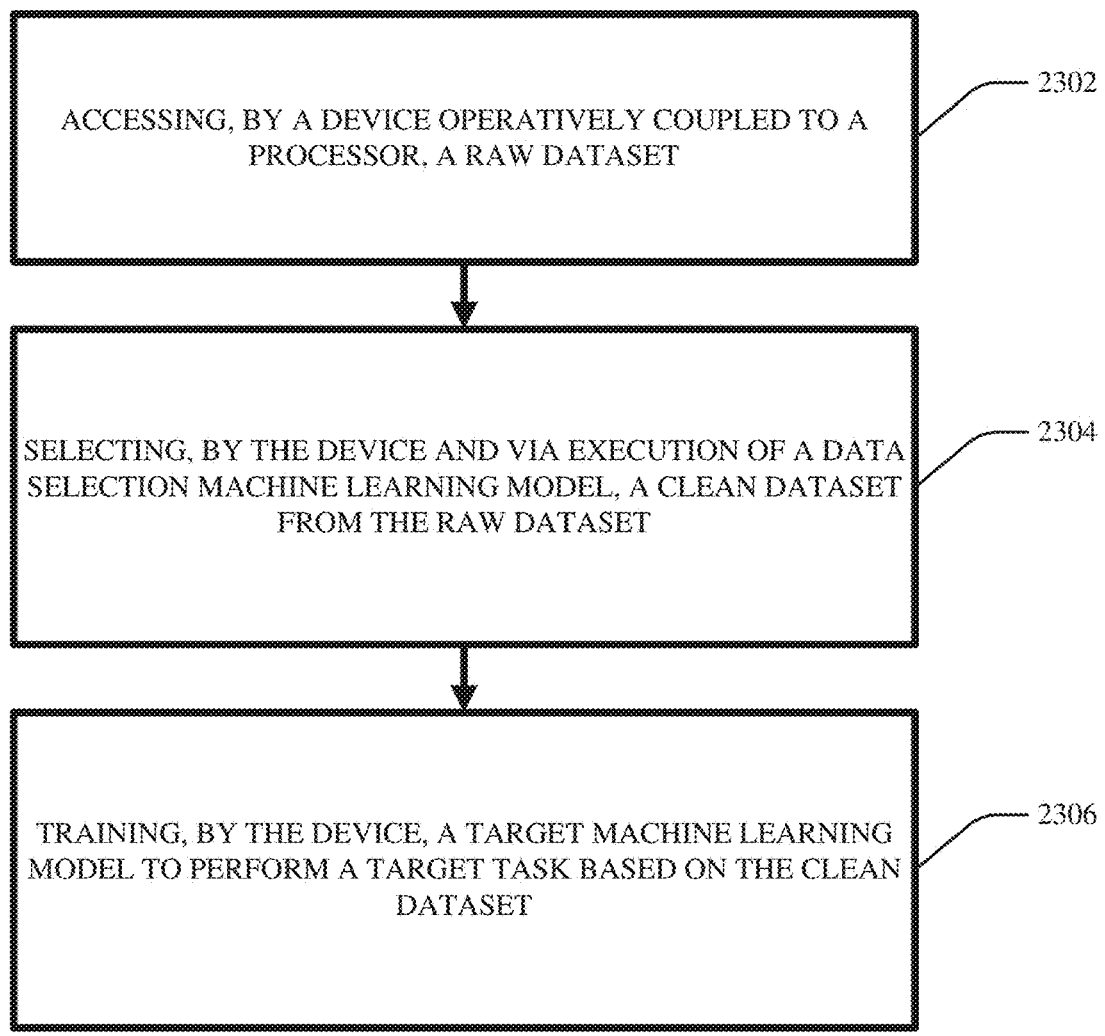
FIG. 23 illustrates a flow diagram of an example, non-limiting computer-implemented method that facilitates learning-based clean data selection in accordance with one or more embodiments described herein.

FIG. 23 illustrates a flow diagram of an example, non-limiting computer-implemented method 2300 that can facilitate learning-based clean data selection in accordance with one or more embodiments described herein. In various cases, the computer-implemented method 2300 can be facilitated by the learning-based clean data selection system 102.

In various embodiments, act 2302 can include accessing, by a device (e.g., 110) operatively coupled to a processor, a raw dataset (e.g., 104).

In various aspects, act 2304 can include selecting, by the device (e.g., 112) and via execution of a data selection machine learning model (e.g., 302), a clean dataset (e.g., 304) from the raw dataset.

In various instances, act 2306 can include training, by the device (e.g., 114), a target machine learning model (e.g., 702) to perform a target task based on the clean dataset.

Although not explicitly shown in FIG. 23, the computer-implemented method 2300 can further comprise: accessing, by the device (e.g., 110) a set of data candidates encountered during deployment of the target machine learning model (e.g., 1002); and executing, by the device (e.g., 116) and after training on the clean dataset, the target machine learning model on the set of data candidates.

Although not explicitly shown in FIG. 23, the raw dataset can include candidate-annotation groupings (e.g., shown in FIG. 2), wherein a candidate-annotation grouping (e.g., such as 802) comprises a data candidate (e.g., 804) and a corresponding target annotation (e.g., 806) that is based on the target task. In various cases, the clean dataset can include candidate-annotation groupings that are in the raw dataset and that are determined by the data selection machine learning model to be suitable for training of the target machine learning model (e.g., determined to be clean), and wherein the clean dataset excludes candidate-annotation groupings that are in the raw dataset and that are determined by the data selection machine learning model to not be suitable for training of the target machine learning model (e.g., determined to be unclean).

Although not explicitly shown in FIG. 23, the target annotation can be a classification label if the target task is data classification, or the target annotation can be a segmentation mask if the target task is data segmentation.

Although not explicitly shown in FIG. 23, the data selection machine learning model can be trained in a supervised fashion based on manually-labeled training data (e.g., 1202), wherein the manually-labeled training data can include candidate-annotation groupings (e.g., shown in FIG. 13) that are manually-labeled as either clean or not clean, wherein candidate-annotation groupings that are manually-labeled as clean in the manually-labeled training data can be suitable for training of the target machine learning model, and wherein candidate-annotation groupings that are manually-labeled as not clean in the manually-labeled training data can be not suitable for training of the target machine learning model.

Although not explicitly shown in FIG. 23, the data selection machine learning model can be a deep learning neural network (e.g., such as shown in FIG. 16) that is configured to receive as input a given candidate-annotation grouping (e.g., 1602) and to produce as output a given binary classification (e.g., 1604) that labels the given candidate-annotation grouping as clean or not clean.

Although not explicitly shown in FIG. 23, the target machine learning model can be configured to receive as input an image (e.g., X-ray image) and to produce as output a higher-quality version of the image, and the data selection machine learning model can be configured to receive as input a low-quality image and a higher-quality version of the low-quality image as an input pair (e.g., a candidate-annotation grouping, such as 1602) and to produce as output a binary classification (e.g., 1604) that labels the input pair as clean or not clean.

Various embodiments described herein include a computerized tool that can facilitate learning-based clean data selection. Specifically, it can be desired to train a target machine learning model to perform a target task on a raw dataset. In various aspects, the computerized tool can electronically execute a data selection machine learning model on the raw dataset, thereby yielding a clean dataset. Accordingly, the computerized tool can train the target machine learning model on the clean dataset. In other words, the computerized tool can be considered as utilizing a first artificial intelligence tool (e.g., the data selection machine learning model) to help train, develop, and/or otherwise create a second artificial intelligence tool (e.g., the target machine learning model). Stated another way, the computerized tool can be considered as utilizing AI to support the development of other AI. As explained above, the data selection machine learning model can be trained, via supervised learning and/or backpropagation, to learn how to distinguish clean data (e.g., data that is suitable to train the target model to perform the target task) from unclean data (e.g., data that is not suitable to train the target model to perform the target task). In this way, clean data can be automatically separated from unclean data, without having to program explicit quantifiable metrics that define clean and/or unclean data (e.g., as mentioned above, such explicit quantifiable metrics might be unavailable and/or not fully accurate). Because the data selection machine learning model can learn from known clean-vs.-unclean exemplars and thus does not require explicit quantifiable metrics that define clean-vs.-unclean, the data selection machine learning model does not require frequent tuning/adjusting of explicit metrics, unlike existing rule-based filtration. For at least these reasons, learning-based clean data selection constitutes a concrete and tangible technical improvement in the field of clean data selection.

Those having ordinary skill in the art will appreciate that the herein disclosure describes non-limiting examples of various embodiments of the invention. For ease of description and/or explanation, various portions of the herein disclosure utilize the term "each" when discussing various embodiments of the invention. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the invention, and it should be further understood that, in various other embodiments of the invention, it can be the case that such description applies to fewer than "each" of that particular computerized object.

To facilitate some of the above-described machine learning aspects of various embodiments of the subject innovation, consider the following discussion of artificial intelligence. Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 24:
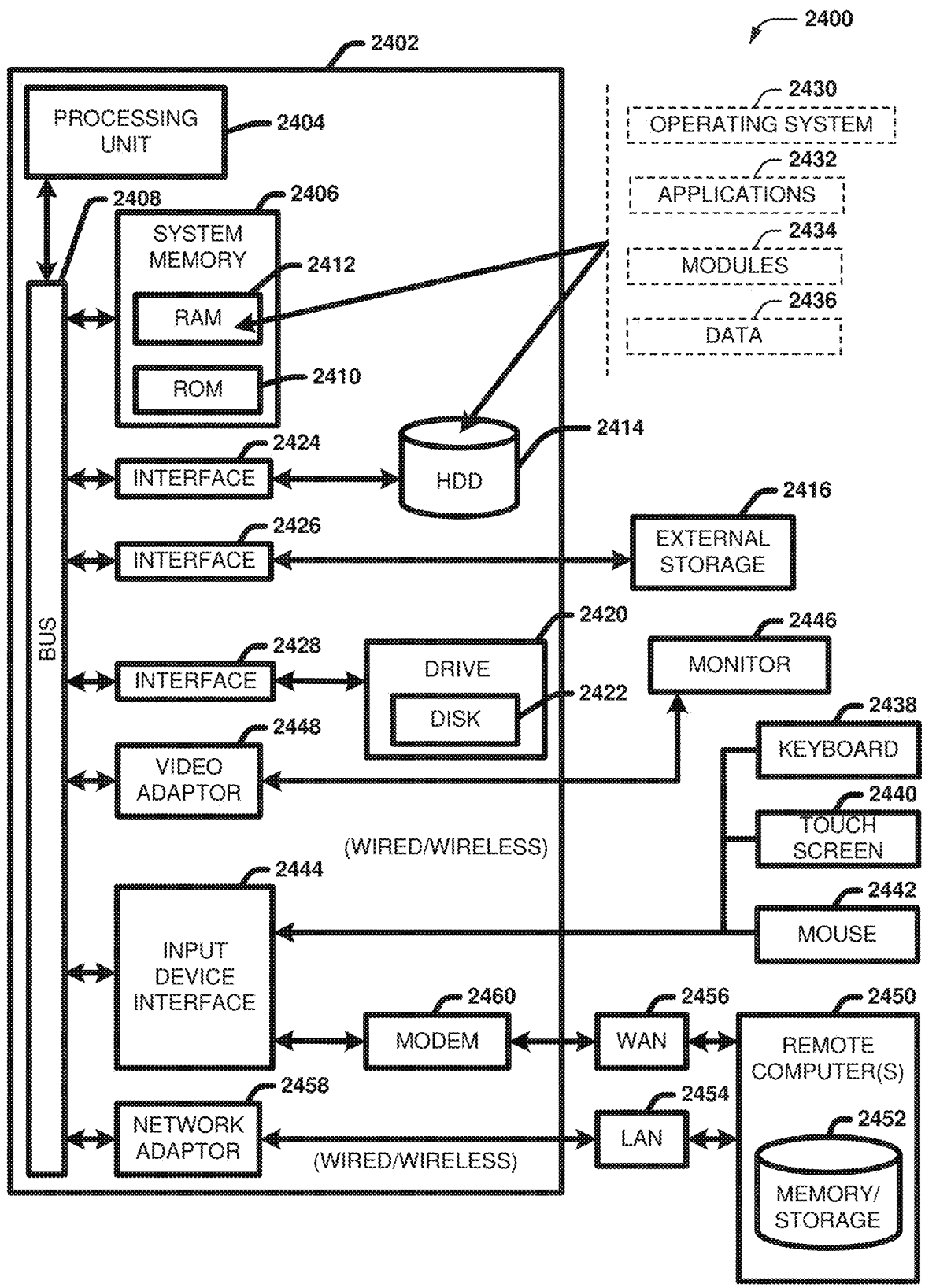
FIG. 24 illustrates a block diagram of an example, non-limiting operating environment in which one or more embodiments described herein can be facilitated.

In order to provide additional context for various embodiments described herein, FIG. 24 and the following discussion are intended to provide a brief, general description of a suitable computing environment 2400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 24, the example environment 2400 for implementing various embodiments of the aspects described herein includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multi processor architectures can also be employed as the processing unit 2404.

The system bus 2408 can be any of several types of bus structure that can further interconnect to a memory bus (with or without a memory controller), a peripheral bus, and a local bus using any of a variety of commercially available bus architectures. The system memory 2406 includes ROM 2410 and RAM 2412. A basic input/output system (BIOS) can be stored in a non-volatile memory such as ROM, erasable programmable read only memory (EPROM), EEPROM, which BIOS contains the basic routines that help to transfer information between elements within the computer 2402, such as during startup. The RAM 2412 can also include a high-speed RAM such as static RAM for caching data.

The computer 2402 further includes an internal hard disk drive (HDD) 2414 (e.g., EIDE, SATA), one or more external storage devices 2416 (e.g., a magnetic floppy disk drive (FDD) 2416, a memory stick or flash drive reader, a memory card reader, etc.) and a drive 2420, e.g., such as a solid state drive, an optical disk drive, which can read or write from a disk 2422, such as a CD-ROM disc, a DVD, a BD, etc. Alternatively, where a solid state drive is involved, disk 2422 would not be included, unless separate. While the internal HDD 2414 is illustrated as located within the computer 2402, the internal HDD 2414 can also be configured for external use in a suitable chassis (not shown). Additionally, while not shown in environment 2400, a solid state drive (SSD) could be used in addition to, or in place of, an HDD 2414. The HDD 2414, external storage device(s) 2416 and drive 2420 can be connected to the system bus 2408 by an HDD interface 2424, an external storage interface 2426 and a drive interface 2428, respectively. The interface 2424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. The systems and methods described herein can be implemented utilizing various commercially available operating systems or combinations of operating systems.

Computer 2402 can optionally comprise emulation technologies. For example, a hypervisor (not shown) or other intermediary can emulate a hardware environment for operating system 2430, and the emulated hardware can optionally be different from the hardware illustrated in FIG. 24. In such an embodiment, operating system 2430 can comprise one virtual machine (VM) of multiple VMs hosted at computer 2402. Furthermore, operating system 2430 can provide runtime environments, such as the Java runtime environment or the .NET framework, for applications 2432. Runtime environments are consistent execution environments that allow applications 2432 to run on any operating system that includes the runtime environment. Similarly, operating system 2430 can support containers, and applications 2432 can be in the form of containers, which are lightweight, standalone, executable packages of software that include, e.g., code, runtime, system tools, system libraries and settings for an application.

Further, computer 2402 can be enable with a security module, such as a trusted processing module (TPM). For instance with a TPM, boot components hash next in time boot components, and wait for a match of results to secured values, before loading a next boot component. This process can take place at any layer in the code execution stack of computer 2402, e.g., applied at the application execution level or at the operating system (OS) kernel level, thereby enabling security at any level of code execution.

A user can enter commands and information into the computer 2402 through one or more wired/wireless input devices, e.g., a keyboard 2438, a touch screen 2440, and a pointing device, such as a mouse 2442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2404 through an input device interface 2444 that can be coupled to the system bus 2408, but can be connected by other interfaces, such as a parallel port, an IEEE 1394 serial port, a game port, a USB port, an IR interface, a BLUETOOTH® interface, etc.

A monitor 2446 or other type of display device can be also connected to the system bus 2408 via an interface, such as a video adapter 2448. In addition to the monitor 2446, a computer typically includes other peripheral output devices (not shown), such as speakers, printers, etc.

The computer 2402 can operate in a networked environment using logical connections via wired and/or wireless communications to one or more remote computers, such as a remote computer(s) 2450. The remote computer(s) 2450 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2452 is illustrated. The logical connections depicted include wired/wireless connectivity to a local area network (LAN) 2454 and/or larger networks, e.g., a wide area network (WAN) 2456. Such LAN and WAN networking environments are commonplace in offices and companies, and facilitate enterprise-wide computer networks, such as intranets, all of which can connect to a global communications network, e.g., the Internet.

When used in a LAN networking environment, the computer 2402 can be connected to the local network 2454 through a wired and/or wireless communication network interface or adapter 2458. The adapter 2458 can facilitate wired or wireless communication to the LAN 2454, which can also include a wireless access point (AP) disposed thereon for communicating with the adapter 2458 in a wireless mode.

When used in a WAN networking environment, the computer 2402 can include a modem 2460 or can be connected to a communications server on the WAN 2456 via other means for establishing communications over the WAN 2456, such as by way of the Internet. The modem 2460, which can be internal or external and a wired or wireless device, can be connected to the system bus 2408 via the input device interface 2444. In a networked environment, program modules depicted relative to the computer 2402 or portions thereof, can be stored in the remote memory/storage device 2452. It will be appreciated that the network connections shown are example and other means of establishing a communications link between the computers can be used.

When used in either a LAN or WAN networking environment, the computer 2402 can access cloud storage systems or other network-based storage systems in addition to, or in place of, external storage devices 2416 as described above, such as but not limited to a network virtual machine providing one or more aspects of storage or processing of information. Generally, a connection between the computer 2402 and a cloud storage system can be established over a LAN 2454 or WAN 2456 e.g., by the adapter 2458 or modem 2460, respectively. Upon connecting the computer 2402 to an associated cloud storage system, the external storage interface 2426 can, with the aid of the adapter 2458 and/or modem 2460, manage storage provided by the cloud storage system as it would other types of external storage. For instance, the external storage interface 2426 can be configured to provide access to cloud storage sources as if those sources were physically connected to the computer 2402.

The computer 2402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 25:
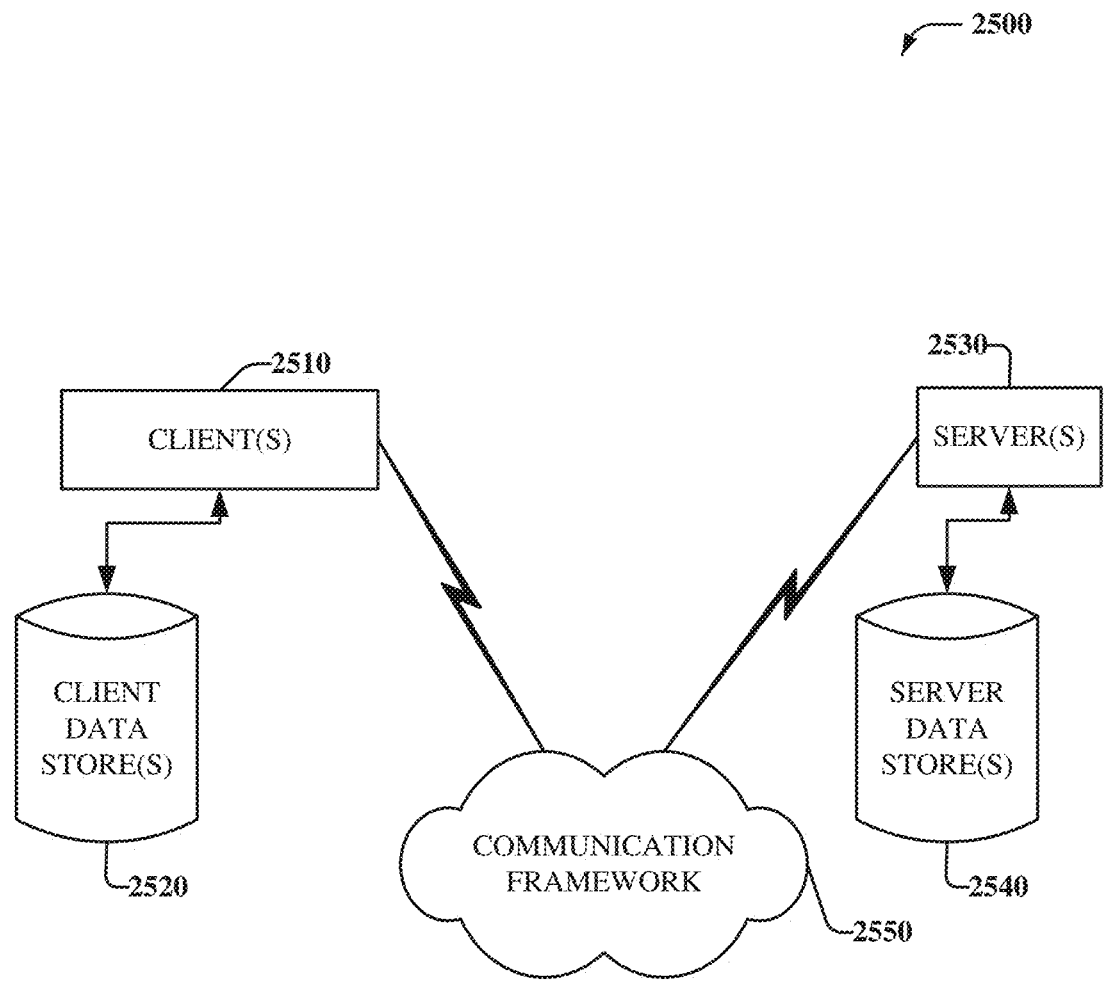
FIG. 25 illustrates an example networking environment operable to execute various implementations described herein.

FIG. 25 is a schematic block diagram of a sample computing environment 2500 with which the disclosed subject matter can interact. The sample computing environment 2500 includes one or more client(s) 2510. The client(s) 2510 can be hardware and/or software (e.g., threads, processes, computing devices). The sample computing environment 2500 also includes one or more server(s) 2530. The server(s) 2530 can also be hardware and/or software (e.g., threads, processes, computing devices). The servers 2530 can house threads to perform transformations by employing one or more embodiments as described herein, for example. One possible communication between a client 2510 and a server 2530 can be in the form of a data packet adapted to be transmitted between two or more computer processes. The sample computing environment 2500 includes a communication framework 2550 that can be employed to facilitate communications between the client(s) 2510 and the server(s) 2530. The client(s) 2510 are operably connected to one or more client data store(s) 2520 that can be employed to store information local to the client(s) 2510. Similarly, the server(s) 2530 are operably connected to one or more server data store(s) 2540 that can be employed to store information local to the servers 2530.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on standalone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components; and
   a processor that executes at least one of the computer-executable components that:
   trains a target machine learning model to perform a target task associated with images according to a group of qualitative criteria, wherein at least one qualitative criterion of the group of qualitative criteria does not have an associated defined quantitative metric for assessing the at least one qualitative criterion, and wherein the training comprises:
   first training of a data selection machine learning model to identify clean training candidate-annotation groupings for training the target machine learning model according to the group of qualitative criteria, wherein the first training comprises:
   accessing a manually-labeled training dataset comprising first training candidate-annotation groupings, wherein respective first training candidate-annotation groupings comprise a respective first training candidate image, a respective first training ground-truth annotation image, and a respective manually assigned label indicating whether the respective training candidate-annotation grouping is clean or unclean according to the group of qualitative criteria; and
   training, using the manually-labeled training dataset, the data selection machine learning model to identify the clean training candidate-annotation groupings for training the target machine learning model according to the group of qualitative criteria; and
   second training of the target machine learning model to perform the target task associated with images according to the group of qualitative criteria, wherein the second training comprises:
   accessing a raw dataset comprising second training candidate- annotation groupings, wherein respective second training candidate- annotation groupings comprise a respective second training candidate image and a respective second training ground-truth annotation image generated by performing the target task on the respective second training candidate image;
   selecting, via execution of the data selection machine learning model, a clean dataset comprising clean second training candidate- annotation groupings according to the group of qualitative criteria from the raw dataset; and
   training, using the clean dataset, the target machine learning model to perform the target task associated with images according to the group of qualitative criteria.

2. The system of claim 1, wherein the at least one of the computer-executable components further:
   accesses a set of image candidates encountered during deployment of the target machine learning model; and
   executes, after training on the clean dataset, the target machine learning model to perform the target task according to the group of qualitative criteria on the set of image candidates.

3. The system of claim 1, wherein the data selection machine learning model is trained to label respective first training candidate-annotation groupings as clean or unclean according to the group of qualitative criteria.

4. The system of claim 1, wherein the respective first training ground-truth annotation image comprises a classification label if the target task is data classification, and wherein the respective first training ground-truth annotation image comprises a segmentation mask if the target task is data segmentation.

5. The system of claim 1, wherein respective first training candidate-annotation groupings that are manually-labeled as clean are used for training of the target machine learning model, and wherein respective first training candidate-annotation groupings that are manually-labeled as unclean are not suitable used for training of the target machine learning model.

6. The system of claim 1, wherein the target task is to produce a high quality image from a low quality image according to the group of qualitative criteria, wherein the high quality image has higher quality than the low quality image according to the group of qualitative criteria.

7. The system of claim 6, wherein the group of qualitative criteria comprise at least one of more contrast, less noise, the high quality image exhibits a substantially similar speckle pattern as the low quality image, or each subarea structure depicted in the high quality image exhibits is also depicted in the low quality image.

8. A computer-implemented method, comprising:
   training, by a system comprising a processor, a target machine learning model to perform a target task associated with images according to a group of qualitative criteria, wherein at least one qualitative criterion of the group of qualitative criteria does not have an associated defined quantitative metric for assessing the at least one qualitative criterion, and wherein the training comprises:

first training of a data selection machine learning model to identify clean training candidate-annotation groupings for training the target machine learning model according to the group of qualitative criteria, wherein the first training comprises:
   accessing a manually-labeled training dataset comprising first training candidate-annotation groupings, wherein respective first training candidate-annotation groupings comprise a respective first training candidate image, a respective first training ground-truth annotation image, and a respective manually assigned label indicating whether the respective training candidate-annotation grouping is clean or unclean according to the group of qualitative criteria; and
      training, using the manually-labeled training dataset, the data selection machine learning model to identify the clean training candidate-annotation groupings for training the target machine learning model according to the group of qualitative criteria; and
second training of the target machine learning model to perform the target task associated with images according to the group of qualitative criteria, wherein the second training comprises:
   accessing a raw dataset comprising second training candidate-annotation groupings, wherein respective second training candidate-annotation groupings comprise a respective second training candidate image and a respective second training ground-truth annotation image generated by performing the target task on the respective second training candidate image;
      selecting, via execution of the data selection machine learning model, a clean dataset comprising clean second training candidate-annotation groupings according to the group of qualitative criteria from the raw dataset; and
      training, using the clean dataset, the target machine learning model to perform the target task associated with images according to the group of qualitative criteria.

9. The computer-implemented method of claim 8, further comprising:
   accessing, by the system, a set of image candidates encountered during deployment of the target machine learning model; and
   executing, by the system and after training on the clean dataset, the target machine learning model to perform the target task according to the group of qualitative criteria on the set of image candidates.

10. The computer-implemented method of claim 8, wherein the data selection machine learning model is trained to label respective first training candidate-annotation groupings as clean or unclean according to the group of qualitative criteria.

11. The computer-implemented method of claim 8, wherein respective first training ground-truth annotation image comprises a classification label if the target task is data classification, and wherein the respective first training ground-truth annotation image comprises a segmentation mask if the target task is data segmentation.

12. The computer-implemented method of claim 8, wherein respective first training candidate-annotation groupings that are manually-labeled as clean are used for training of the target machine learning model, and wherein respective first training candidate-annotation groupings that are manually-labeled as unclean are not used for training of the target machine learning model.

13. The computer-implemented method of claim 8, wherein the target task is to produce a high quality image from a low quality image according to the group of qualitative criteria, wherein the high quality image has higher quality than the low quality image according to the group of qualitative criteria.

14. The computer-implemented method of claim 13, wherein the group of qualitative criteria comprise at least one of more contrast, less noise, the high quality image exhibits a substantially similar speckle pattern as the low quality image, or each subarea structure depicted in the high quality image exhibits is also depicted in the low quality image.

15. A computer program product for facilitating learning-based clean data selection, the computer program product comprising a computer-readable memory having program instructions embodied therewith, the program instructions executable by a processor to cause the processor to:
   train a target machine learning model to perform a target task associated with images according to a group of qualitative criteria, wherein at least one qualitative criterion of the group of qualitative criteria does not have an associated defined quantitative metric for assessing the at least one qualitative criterion, and wherein the training comprises:
   first training of a data selection machine learning model to identify clean training candidate-annotation groupings for training the target machine learning model according to the group of qualitative criteria, wherein the first training comprises:
      accessing a manually-labeled training dataset comprising first training candidate-annotation groupings, wherein respective first training candidate-annotation groupings comprise a respective first training candidate image, a respective first training ground-truth annotation image, and a respective manually assigned label indicating whether the respective training candidate-annotation grouping is clean or unclean according to the group of qualitative criteria; and
      training, using the manually-labeled training dataset, the data selection machine learning model to identify the clean training candidate-annotation groupings for training the target machine learning model according to the group of qualitative criteria; and
   second training of the target machine learning model to perform the target task associated with images according to the group of qualitative criteria, wherein the second training comprises:
      accessing a raw dataset comprising second training candidate-annotation groupings, wherein respective second training candidate-annotation groupings comprise a respective second training candidate image and a respective second training ground-truth annotation image generated by performing the target task on the respective second training candidate image;
      selecting, via execution of the data selection machine learning model, a clean dataset comprising clean second training candidate-annotation groupings according to the group of qualitative criteria from the raw dataset; and training, using the clean dataset, the target machine learning model to perform the target task associated with images according to the group of qualitative criteria.

16. The computer program product of claim 15, wherein the program instructions are further executable to cause the processor to:
   access a set of image candidates encountered during deployment of the target machine learning model; and
   execute, after training on the clean dataset, the target machine learning model to perform the target task according to the group of qualitative criteria on the set of image candidates.

17. The computer program product of claim 15, wherein the data selection machine learning model is trained to label respective first training candidate-annotation groupings as clean or unclean according to the group of qualitative criteria.

18. The computer program product of claim 15, wherein the respective first training ground-truth annotation image comprises a classification label if the target task is data classification, and wherein the respective first training ground-truth annotation image comprises a segmentation mask if the target task is data segmentation.

19. The computer program product of claim 17, wherein respective first training candidate-annotation groupings that are manually-labeled as clean are used for training of the target machine learning model, and wherein respective first training candidate-annotation groupings that are manually-labeled as unclean are not used for training of the target machine learning model.

20. The computer program product of claim 17, wherein the target task is to produce a high quality image from a low quality image according to the group of qualitative criteria, wherein the high quality image has higher quality than the low quality image according to the group of qualitative criteria.

* * * * *